US009146774B2

(12) United States Patent
Busaba et al.

(10) Patent No.: US 9,146,774 B2
(45) Date of Patent: Sep. 29, 2015

(54) COALESCING MEMORY TRANSACTIONS

(71) Applicant: International Business Machines Corporation, Armonk, NY (US)

(72) Inventors: Fadi Y. Busaba, Poughkeepsie, NY (US); Michael Karl Gschwind, Chappaqua, NY (US); Maged M. Michael, Danbury, CT (US); Valentina Salapura, Chappaqua, NY (US); Chung-Lung K. Shum, Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 99 days.

(21) Appl. No.: 14/104,169

(22) Filed: Dec. 12, 2013

(65) Prior Publication Data

US 2015/0169357 A1 Jun. 18, 2015

(51) Int. Cl.
*G06F 12/10* (2006.01)
*G06F 9/46* (2006.01)
*G06F 9/52* (2006.01)
*G06F 3/06* (2006.01)

(52) U.S. Cl.
CPC *G06F 9/467* (2013.01); *G06F 9/52* (2013.01); *G06F 9/526* (2013.01); *G06F 3/0613* (2013.01)

(58) Field of Classification Search
CPC .......... G06F 9/52; G06F 9/467; G06F 3/0613
USPC ....................................................... 711/150
See application file for complete search history.

(56) References Cited

U.S. PATENT DOCUMENTS

| 5,657,472 | A | | 8/1997 | Van Loo et al. |
| 5,918,000 | A | * | 6/1999 | Yamashita et al. ........... 714/6.32 |
| 6,021,467 | A | * | 2/2000 | Konigsburg et al. .......... 711/122 |
| 6,349,361 | B1 | | 2/2002 | Altman et al. |
| 7,185,005 | B1 | | 2/2007 | Long et al. |
| 7,516,366 | B2 | | 4/2009 | Lev et al. |
| 7,730,286 | B2 | | 6/2010 | Petersen et al. |

(Continued)

OTHER PUBLICATIONS

Busaba et al., U.S. Appl. No. 14/104,228, "Software Indications and Hints for Coalescing Memory Transactions", filed Dec. 12, 2013.

(Continued)

*Primary Examiner* — Jae Yu
(74) *Attorney, Agent, or Firm* — Isaac J. Gooshaw

(57) ABSTRACT

A transactional memory system coalesces two outermost transactions in a transactional memory environment. A processor of the transactional memory system executes a first transaction begin instruction of a first outermost transaction and processes the first transaction. Based on encountering a first transaction end instruction of the first outermost transaction, the processor determines whether the first transaction is to-be coalesced with a second outermost transaction. Based on a determination that the first outermost transaction is to-be coalesced, the processor does not commit store data of the first outermost transaction to memory prior to processing the second outermost transaction. Based on encountering a second transaction begin instruction of the second outermost transaction, the processor processes the second transaction. Based on encountering a second transaction end instruction of the second outermost transaction, the processor commits the store data of the coalesced first outermost transaction and second outermost transaction to memory.

20 Claims, 16 Drawing Sheets

(56) References Cited

U.S. PATENT DOCUMENTS

| | | | |
|---|---|---|---|
| 7,890,472 | B2 | 2/2011 | Magruder et al. |
| 8,095,741 | B2 | 1/2012 | Heller, Jr. et al. |
| 8,117,403 | B2 | 2/2012 | Heller, Jr. et al. |
| 8,180,977 | B2 | 5/2012 | Rajwar et al. |
| 8,266,604 | B2 | 9/2012 | Groff et al. |
| 8,281,185 | B2 | 10/2012 | Nussbaum et al. |
| 2001/0011374 | A1* | 8/2001 | Lerman et al. .......... 725/92 |
| 2002/0184460 | A1 | 12/2002 | Tremblay et al. |
| 2007/0162520 | A1 | 7/2007 | Petersen et al. |
| 2007/0260942 | A1 | 11/2007 | Rajwar et al. |
| 2009/0031309 | A1 | 1/2009 | Lev |
| 2009/0031310 | A1 | 1/2009 | Lev et al. |
| 2010/0162247 | A1 | 6/2010 | Welc et al. |
| 2010/0169870 | A1 | 7/2010 | Dice |
| 2010/0205408 | A1 | 8/2010 | Chung et al. |
| 2011/0161603 | A1 | 6/2011 | Taillefer |

OTHER PUBLICATIONS

Busaba et al., U.S. Appl. No. 14/104,316, "Code Optimization to Enable and Disable Coalescing of Memory Transactions", filed Dec. 12, 2013.

Busaba et al., U.S. Appl. No. 14/104,380, "Dynamic Predictor for Coalescing of Memory Transactions", filed Dec. 12, 2013.

Busaba et al., U.S. Appl. No. 14/104,223, "Software Enabled and Disabled Coalescing of Memory Transactions", filed Dec. 12, 2013.

Ananian, et al., "Unbounded Transactional Memory", MIT Computer Science and Artificial Intelligence Laboratory, The Stata Center, 32 Vassar St., Cambridge, MA 02139, Proceedings of the 11th Int'l Symposium on High-Performance Computer Architecture (HPCA-11 2005), Copyright 2005, IEEE.

Baugh, et al., "A Lazy Approach for Supporting Nested Transactions", Dept. of Computer Science, University of Illinois at Urbana-Champaign, provided in the search report on Feb. 19, 2013.

Waliullah et al., "Intermediate Checkpointing with Conflicting Access Prediction in Transactional Memory Systems", Department of Computer Science and Engineering, Chalmers University of Technology, SE 412-96 Göteborg, Sweden, pp. 1-15, provided in the search report on Feb. 25, 2013.

Proceedings 2012 IEEE/ACM 45th International Symposium on Microarchitecture MICRO-45, presented Dec. 1-5, 2012, "Transactional Memory Architecture and Implementation for IBM System z", pp. 25-36.

IBM, "Principles of Operation", Tenth Edition (Sep. 2012), SA22-7832-09.

"Intel® Architecture Instruction Set Extensions Programming Reference", 319433-012A, Feb. 2012.

Austen McDonald, "Architectures for Transactional Memory", A Dissertation Submitted to the Department of Computer Science and the Committee on Graduate Studies of Stanford University in Partial Fulfillment of the Requirements for the Degree of Doctor of Philosophy, Jun. 2009, pp. 1-145.

P. Mak et al., IBM J. Res. & Dev. vol. 53, No. 1, Paper 2, 2009, "IBM System z10 Processor Cache Subsystem Microarchitecture", pp. 2:1-2:12.

* cited by examiner

COALESCING MEMORY TRANSACTIONS

BACKGROUND

This disclosure relates generally to the field of Transactional Memory (TM) execution, and more specifically to the processing of multiple memory transactions as a single transaction.

The number of central processing unit (CPU) cores on a chip and the number of CPU cores connected to a shared memory continues to grow significantly to support growing workload capacity demand. The increasing number of CPUs cooperating to process the same workloads puts a significant burden on software scalability; for example, shared queues or data-structures protected by traditional semaphores become hot spots and lead to sub-linear n-way scaling curves. Traditionally this has been countered by implementing finer-grained locking in software, and with lower latency/higher bandwidth interconnects in hardware. Implementing fine-grained locking to improve software scalability can be very complicated and error-prone, and at today's CPU frequencies, the latencies of hardware interconnects are limited by the physical dimension of the chips and systems, and by the speed of light.

Implementations of hardware Transactional Memory (HTM, or in this discussion, simply TM) have been introduced, wherein a group of instructions—called a transaction—operate in an atomic manner on a data structure in memory, as viewed by other central processing units (CPUs) and the I/O subsystem (atomic operation is also known as "block concurrent" or "serialized" in other literature). The transaction executes optimistically without obtaining a lock, but may need to abort and retry the transaction execution if an operation, of the executing transaction, on a memory location conflicts with another operation on the same memory location. Previously, software transactional memory implementations have been proposed to support software Transactional Memory (TM). However, hardware TM can provide improved performance aspects and ease of use over software TM.

U.S. Pat. No. 7,185,005 titled "Nested Transactions in a File System" filed May 11, 2001, incorporated herein by reference in its entirety, teaches techniques provided for performing operations in an electronic file system as nested transactions. According to one aspect of the disclosure, a command to perform one or more file system operations is received. In response to the command, a plurality of operations, including the one or more file system operations, are performed. Performing the plurality of operations includes: (1) performing a first subset of the plurality of operations as part of a first transaction; and (2) performing a second subset of the plurality of operations as part of a second transaction that is nested in the first transaction.

U.S. Pat. No. 7,730,286 titled "Software Assisted Nested Hardware Transactions" filed Dec. 30, 2005, incorporated herein by reference in its entirety, teaches a method and apparatus for efficiently executing nested transactions. Hardware support for execution of transactions is provided. Additionally, through the use of logging previous values immediately before a current nested transaction in a local memory and storage of a stack of handlers associated with a hierarchy of transactions, nested transactions are potentially efficiently executed. Upon a failure, abort, or invalidating event/access within a nested transaction, the state of variables or memory locations written to during execution of the nested transaction are rolled-back to immediately before the nested transaction, instead of all the way back to an original state of the variables or memory locations before an enclosing transaction. As a result, nested transactions may be re-executed within enclosing transactions, without flattening the enclosing and nested transactions to re-execute everything.

SUMMARY

Embodiments of the present disclosure provide a method, computer system, and computer program product for a transactional memory system that coalesces two outermost transactions in a transactional memory environment. A processor of the transactional memory system executes a first transaction begin instruction of a first outermost transaction. Based on execution of the first transaction begin instruction, the computer processor processes the first transaction. Based on the processing encountering a first transaction end instruction of the first outermost transaction, the computer processor determines whether the first transaction is to-be coalesced with a second outermost transaction. Based on the determining indicating that the first outermost transaction is to-be coalesced with the second outermost transaction, the computer processor performing a method comprising: The computer processor not-committing store data of the first outermost transaction to memory prior to processing the second outermost transaction. Based on encountering a second transaction begin instruction of the second outermost transaction, processing the second transaction. Based on the processing the second transaction encountering a second transaction end instruction of the second outermost transaction, committing the store data of the coalesced first outermost transaction and second outermost transaction to memory.

BRIEF DESCRIPTION OF THE SEVERAL VIEWS OF THE DRAWINGS

One or more aspects of the present disclosed embodiments are particularly pointed out and distinctly claimed as examples in the claims at the conclusion of the specification. The foregoing and other objects, features, and advantages of the disclosed embodiments are apparent from the following detailed description taken in conjunction with the accompanying drawings in which:

DETAILED DESCRIPTION

Figure 2:
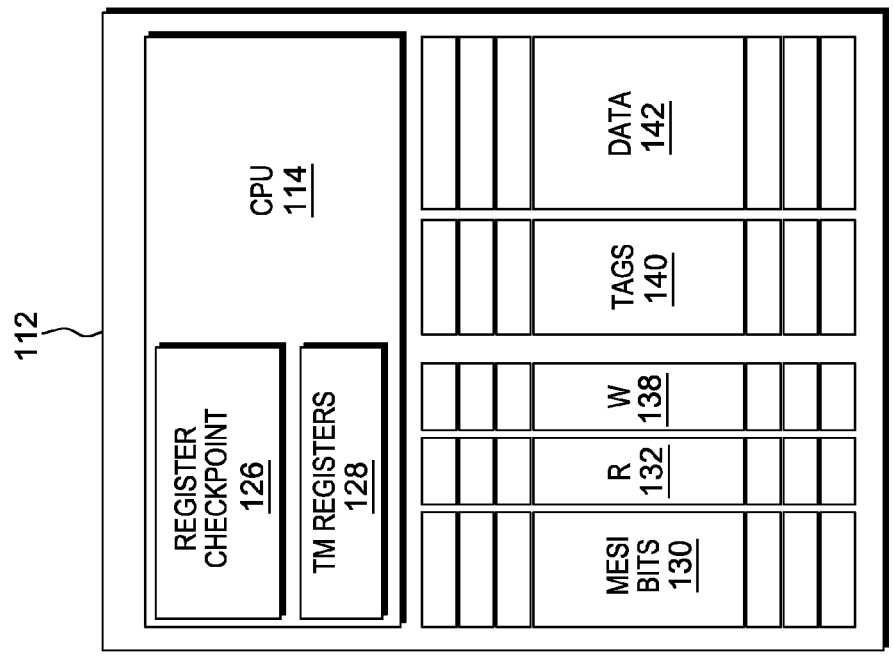
FIGS. 1 and 2 depict block diagrams of an example multi-core Transactional Memory environment, in accordance with embodiments of the present disclosure.

Historically, a computer system or processor had only a single processor (aka processing unit or central processing unit). The processor included an instruction processing unit (IPU), a branch unit, a memory control unit and the like. Such processors were capable of executing a single thread of a program at a time. Operating systems were developed that could time-share a processor by dispatching a program to be executed on the processor for a period of time, and then dispatching another program to be executed on the processor for another period of time. As technology evolved, memory subsystem caches were often added to the processor as well as complex dynamic address translation including translation lookaside buffers (TLBs). The IPU itself was often referred to as a processor. As technology continued to evolve, an entire processor, could be packaged in a single semiconductor chip or die, such a processor was referred to as a microprocessor. Then processors were developed that incorporated multiple IPUs, such processors were often referred to as multi-processors. Each such processor of a multi-processor computer system (processor) may include individual or shared caches, memory interfaces, system bus, address translation mechanism and the like. Virtual machine and instruction set architecture (ISA) emulators added a layer of software to a processor, that provided the virtual machine with multiple "virtual processors" (aka processors) by time-slice usage of a single IPU in a single hardware processor. As technology further evolved, multi-threaded processors were developed, enabling a single hardware processor having a single multi-thread IPU to provide a capability of simultaneously executing threads of different programs, thus each thread of a multi-threaded processor appeared to the operating system as a processor. As technology further evolved, it was possible to put multiple processors (each having an IPU) on a single semiconductor chip or die. These processors were referred to processor cores or just cores. Thus the terms such as processor, central processing unit, processing unit, microprocessor, core, processor core, processor thread, and thread, for example, are often used interchangeably. Aspects of embodiments herein may be practiced by any or all processors including those shown supra, without departing from the teachings herein. Wherein the term "thread" or "processor thread" is used herein, it is expected that particular advantage of the embodiment may be had in a processor thread implementation.

Transaction Execution in Intel® Based Embodiments

In "Intel® Architecture Instruction Set Extensions Programming Reference" 319433-012A, February 2012, incorporated herein by reference in its entirety, Chapter 8 teaches, in part, that multithreaded applications may take advantage of increasing numbers of CPU cores to achieve higher performance. However, the writing of multi-threaded applications requires programmers to understand and take into account data sharing among the multiple threads. Access to shared data typically requires synchronization mechanisms. These synchronization mechanisms are used to ensure that multiple threads update shared data by serializing operations that are applied to the shared data, often through the use of a critical section that is protected by a lock. Since serialization limits concurrency, programmers try to limit the overhead due to synchronization.

Intel® Transactional Synchronization Extensions (Intel® TSX) allow a processor to dynamically determine whether threads need to be serialized through lock-protected critical sections, and to perform that serialization only when required. This allows the processor to expose and exploit concurrency that is hidden in an application because of dynamically unnecessary synchronization.

With Intel TSX, programmer-specified code regions (also referred to as "transactional regions" or just "transactions") are executed transactionally. If the transactional execution completes successfully, then all memory operations performed within the transactional region will appear to have occurred instantaneously when viewed from other processors. A processor makes the memory operations of the executed transaction, performed within the transactional region, visible to other processors only when a successful commit occurs, i.e., when the transaction successfully completes execution. This process is often referred to as an atomic commit.

Intel TSX provides two software interfaces to specify regions of code for transactional execution. Hardware Lock Elision (HLE) is a legacy compatible instruction set extension (comprising the XACQUIRE and XRELEASE prefixes) to specify transactional regions. Restricted Transactional Memory (RTM) is a new instruction set interface (comprising the XBEGIN, XEND, and XABORT instructions) for programmers to define transactional regions in a more flexible manner than that possible with HLE. HLE is for programmers who prefer the backward compatibility of the conventional mutual exclusion programming model and would like to run HLE-enabled software on legacy hardware but would also like to take advantage of the new lock elision capabilities on hardware with HLE support. RTM is for programmers who prefer a flexible interface to the transactional execution hardware. In addition, Intel TSX also provides an XTEST instruction. This instruction allows software to query whether the logical processor is transactionally executing in a transactional region identified by either HLE or RTM.

Since a successful transactional execution ensures an atomic commit, the processor executes the code region optimistically without explicit synchronization. If synchronization was unnecessary for that specific execution, execution can commit without any cross-thread serialization. If the processor cannot commit atomically, then the optimistic execution fails. When this happens, the processor will roll back the execution, a process referred to as a transactional abort. On a transactional abort, the processor will discard all updates performed in the memory region used by the transaction, restore architectural state to appear as if the optimistic execution never occurred, and resume execution non-transactionally.

A processor can perform a transactional abort for numerous reasons. A primary reason to abort a transaction is due to conflicting memory accesses between the transactionally executing logical processor and another logical processor. Such conflicting memory accesses may prevent a successful transactional execution. Memory addresses read from within a transactional region constitute the read-set of the transactional region and addresses written to within the transactional region constitute the write-set of the transactional region. Intel TSX maintains the read- and write-sets at the granularity of a cache line. A conflicting memory access occurs if another logical processor either reads a location that is part of the transactional region's write-set or writes a location that is a part of either the read- or write-set of the transactional region. A conflicting access typically means that serialization is required for this code region. Since Intel TSX detects data conflicts at the granularity of a cache line, unrelated data locations placed in the same cache line will be detected as conflicts that result in transactional aborts. Transactional aborts may also occur due to limited transactional resources. For example, the amount of data accessed in the region may exceed an implementation-specific capacity. Additionally, some instructions and system events may cause transactional aborts. Frequent transactional aborts result in wasted cycles and increased inefficiency.

Hardware Lock Elision

Hardware Lock Elision (HLE) provides a legacy compatible instruction set interface for programmers to use transactional execution. HLE provides two new instruction prefix hints: XACQUIRE and XRELEASE.

With HLE, a programmer adds the XACQUIRE prefix to the front of the instruction that is used to acquire the lock that is protecting the critical section. The processor treats the prefix as a hint to elide the write associated with the lock acquire operation. Even though the lock acquire has an associated write operation to the lock, the processor does not add the address of the lock to the transactional region's write-set nor does it issue any write requests to the lock. Instead, the address of the lock is added to the read-set. The logical processor enters transactional execution. If the lock was available before the XACQUIRE prefixed instruction, then all other processors will continue to see the lock as available afterwards. Since the transactionally executing logical processor neither added the address of the lock to its write-set nor performed externally visible write operations to the lock, other logical processors can read the lock without causing a data conflict. This allows other logical processors to also enter and concurrently execute the critical section protected by the lock. The processor automatically detects any data conflicts that occur during the transactional execution and will perform a transactional abort if necessary.

Even though the eliding processor did not perform any external write operations to the lock, the hardware ensures program order of operations on the lock. If the eliding processor itself reads the value of the lock in the critical section, it will appear as if the processor had acquired the lock, i.e. the read will return the non-elided value. This behavior allows an HLE execution to be functionally equivalent to an execution without the HLE prefixes.

An XRELEASE prefix can be added in front of an instruction that is used to release the lock protecting a critical section. Releasing the lock involves a write to the lock. If the instruction is to restore the value of the lock to the value the lock had prior to the XACQUIRE prefixed lock acquire operation on the same lock, then the processor elides the external write request associated with the release of the lock and does not add the address of the lock to the write-set. The processor then attempts to commit the transactional execution.

With HLE, if multiple threads execute critical sections protected by the same lock but they do not perform any conflicting operations on each other's data, then the threads can execute concurrently and without serialization. Even though the software uses lock acquisition operations on a common lock, the hardware recognizes this, elides the lock, and executes the critical sections on the two threads without requiring any communication through the lock—if such communication was dynamically unnecessary.

If the processor is unable to execute the region transactionally, then the processor will execute the region non-transactionally and without elision. HLE enabled software has the same forward progress guarantees as the underlying non-HLE lock-based execution. For successful HLE execution, the lock and the critical section code must follow certain guidelines. These guidelines only affect performance; and failure to follow these guidelines will not result in a functional failure. Hardware without HLE support will ignore the XACQUIRE and XRELEASE prefix hints and will not perform any elision since these prefixes correspond to the REPNE/REPE IA-32 prefixes which are ignored on the instructions where XACQUIRE and XRELEASE are valid. Importantly, HLE is compatible with the existing lock-based programming model. Improper use of hints will not cause functional bugs though it may expose latent bugs already in the code.

Restricted Transactional Memory (RTM) provides a flexible software interface for transactional execution. RTM provides three new instructions—XBEGIN, XEND, and XABORT—for programmers to start, commit, and abort a transactional execution.

The programmer uses the XBEGIN instruction to specify the start of a transactional code region and the XEND instruction to specify the end of the transactional code region. If the RTM region could not be successfully executed transactionally, then the XBEGIN instruction takes an operand that provides a relative offset to the fallback instruction address.

A processor may abort RTM transactional execution for many reasons. In many instances, the hardware automatically detects transactional abort conditions and restarts execution from the fallback instruction address with the architectural state corresponding to that present at the start of the XBEGIN instruction and the EAX register updated to describe the abort status.

The XABORT instruction allows programmers to abort the execution of an RTM region explicitly. The XABORT instruction takes an 8-bit immediate argument that is loaded into the EAX register and will thus be available to software following an RTM abort. RTM instructions do not have any data memory location associated with them. While the hardware provides no guarantees as to whether an RTM region will ever successfully commit transactionally, most transactions that follow the recommended guidelines are expected to successfully commit transactionally. However, programmers must always provide an alternative code sequence in the fallback path to guarantee forward progress. This may be as simple as acquiring a lock and executing the specified code region non-transactionally. Further, a transaction that always aborts on a given implementation may complete transactionally on a future implementation. Therefore, programmers must ensure the code paths for the transactional region and the alternative code sequence are functionally tested.

Detection of HLE Support

A processor supports HLE execution if CPUID.07H.EBX.HLE [bit 4]=1. However, an application can use the HLE prefixes (XACQUIRE and XRELEASE) without checking whether the processor supports HLE. Processors without HLE support ignore these prefixes and will execute the code without entering transactional execution.

Detection of RTM Support

A processor supports RTM execution if CPUID.07H.EBX.RTM [bit 11]=1. An application must check if the processor supports RTM before it uses the RTM instructions (XBEGIN, XEND, XABORT). These instructions will generate a #UD exception when used on a processor that does not support RTM.

Detection of XTEST Instruction

A processor supports the XTEST instruction if it supports either HLE or RTM. An application must check either of these feature flags before using the XTEST instruction. This instruction will generate a #UD exception when used on a processor that does not support either HLE or RTM.

Querying Transactional Execution Status

The XTEST instruction can be used to determine the transactional status of a transactional region specified by HLE or RTM. Note, while the HLE prefixes are ignored on processors that do not support HLE, the XTEST instruction will generate a #UD exception when used on processors that do not support either HLE or RTM.

Requirements for HLE Locks

For HLE execution to successfully commit transactionally, the lock must satisfy certain properties and access to the lock must follow certain guidelines.

An XRELEASE prefixed instruction must restore the value of the elided lock to the value it had before the lock acquisition. This allows hardware to safely elide locks by not adding them to the write-set. The data size and data address of the lock release (XRELEASE prefixed) instruction must match that of the lock acquire (XACQUIRE prefixed) and the lock must not cross a cache line boundary.

Software should not write to the elided lock inside a transactional HLE region with any instruction other than an XRELEASE prefixed instruction, otherwise such a write may cause a transactional abort. In addition, recursive locks (where a thread acquires the same lock multiple times without first releasing the lock) may also cause a transactional abort. Note that software can observe the result of the elided lock acquire inside the critical section. Such a read operation will return the value of the write to the lock.

The processor automatically detects violations to these guidelines, and safely transitions to a non-transactional execution without elision. Since Intel TSX detects conflicts at the granularity of a cache line, writes to data collocated on the same cache line as the elided lock may be detected as data conflicts by other logical processors eliding the same lock.

Transactional Nesting

Both HLE and RTM support nested transactional regions. However, a transactional abort restores state to the operation that started transactional execution: either the outermost XACQUIRE prefixed HLE eligible instruction or the outermost XBEGIN instruction. The processor treats all nested transactions as one transaction.

HLE Nesting and Elision

Programmers can nest HLE regions up to an implementation specific depth of MAX_HLE_NEST_COUNT. Each logical processor tracks the nesting count internally but this count is not available to software. An XACQUIRE prefixed HLE-eligible instruction increments the nesting count, and an XRELEASE prefixed HLE-eligible instruction decrements it. The logical processor enters transactional execution when the nesting count goes from zero to one. The logical processor attempts to commit only when the nesting count becomes zero. A transactional abort may occur if the nesting count exceeds MAX_HLE_NEST_COUNT.

In addition to supporting nested HLE regions, the processor can also elide multiple nested locks. The processor tracks a lock for elision beginning with the XACQUIRE prefixed HLE eligible instruction for that lock and ending with the XRELEASE prefixed HLE eligible instruction for that same lock. The processor can, at any one time, track up to a MAX_HLE_ELIDED_LOCKS number of locks. For example, if the implementation supports a MAX_HLE_ELIDED_LOCKS value of two and if the programmer nests three HLE identified critical sections (by performing XACQUIRE prefixed HLE eligible instructions on three distinct locks without performing an intervening XRELEASE prefixed HLE eligible instruction on any one of the locks), then the first two locks will be elided, but the third won't be elided (but will be added to the transaction's write-set). However, the execution will still continue transactionally. Once an XRELEASE for one of the two elided locks is encountered, a subsequent lock acquired through the XACQUIRE prefixed HLE eligible instruction will be elided.

The processor attempts to commit the HLE execution when all elided XACQUIRE and XRELEASE pairs have been matched, the nesting count goes to zero, and the locks have satisfied requirements. If execution cannot commit atomically, then execution transitions to a non-transactional execution without elision as if the first instruction did not have an XACQUIRE prefix.

RTM Nesting

Programmers can nest RTM regions up to an implementation specific MAX_RTM_NEST_COUNT. The logical processor tracks the nesting count internally but this count is not available to software. An XBEGIN instruction increments the nesting count, and an XEND instruction decrements the nesting count. The logical processor attempts to commit only if the nesting count becomes zero. A transactional abort occurs if the nesting count exceeds MAX_RTM_NEST_COUNT.

Nesting HLE and RTM

HLE and RTM provide two alternative software interfaces to a common transactional execution capability. Transactional processing behavior is implementation specific when HLE and RTM are nested together, e.g., HLE is inside RTM or RTM is inside HLE. However, in all cases, the implementation will maintain HLE and RTM semantics. An implementation may choose to ignore HLE hints when used inside RTM regions, and may cause a transactional abort when RTM instructions are used inside HLE regions. In the latter case, the transition from transactional to non-transactional execution occurs seamlessly since the processor will re-execute the HLE region without actually doing elision, and then execute the RTM instructions.

Abort Status Definition

RTM uses the EAX register to communicate abort status to software. Following an RTM abort the EAX register has the following definition.

TABLE 1

RTM Abort Status Definition

| EAX Register Bit Position | Meaning |
| --- | --- |
| 0 | Set if abort caused by XABORT instruction |
| 1 | If set, the transaction may succeed on retry, this bit is always clear if bit 0 is set |
| 2 | Set if another logical processor conflicted with a memory address that was part of the transaction that aborted |
| 3 | Set if an internal buffer overflowed |
| 4 | Set if a debug breakpoint was hit |
| 5 | Set if an abort occurred during execution of a nested transaction |
| 23:6 | Reserved |
| 31-24 | XABORT argument (only valid if bit 0 set, otherwise reserved) |

The EAX abort status for RTM only provides causes for aborts. It does not by itself encode whether an abort or commit occurred for the RTM region. The value of EAX can be 0 following an RTM abort. For example, a CPUID instruction when used inside an RTM region causes a transactional abort and may not satisfy the requirements for setting any of the EAX bits. This may result in an EAX value of 0.

RTM Memory Ordering

A successful RTM commit causes all memory operations in the RTM region to appear to execute atomically. A successfully committed RTM region consisting of an XBEGIN followed by an XEND, even with no memory operations in the RTM region, has the same ordering semantics as a LOCK prefixed instruction.

The XBEGIN instruction does not have fencing semantics. However, if an RTM execution aborts, then all memory updates from within the RTM region are discarded and are not made visible to any other logical processor.

RTM-Enabled Debugger Support

By default, any debug exception inside an RTM region will cause a transactional abort and will redirect control flow to the fallback instruction address with architectural state recovered and bit 4 in EAX set. However, to allow software debuggers to intercept execution on debug exceptions, the RTM architecture provides additional capability.

If bit 11 of DR7 and bit 15 of the IA32_DEBUGCTL_MSR are both 1, any RTM abort due to a debug exception (#DB) or breakpoint exception (#BP) causes execution to roll back and restart from the XBEGIN instruction instead of the fallback address. In this scenario, the EAX register will also be restored back to the point of the XBEGIN instruction.

Programming Considerations

Typical programmer-identified regions are expected to transactionally execute and commit successfully. However, Intel TSX does not provide any such guarantee. A transactional execution may abort for many reasons. To take full advantage of the transactional capabilities, programmers should follow certain guidelines to increase the probability of their transactional execution committing successfully.

This section discusses various events that may cause transactional aborts. The architecture ensures that updates performed within a transaction that subsequently aborts execution will never become visible. Only committed transactional executions initiate an update to the architectural state. Transactional aborts never cause functional failures and only affect performance.

Instruction Based Considerations

Programmers can use any instruction safely inside a transaction (HLE or RTM) and can use transactions at any privilege level. However, some instructions will always abort the transactional execution and cause execution to seamlessly and safely transition to a non-transactional path.

Intel TSX allows for most common instructions to be used inside transactions without causing aborts. The following operations inside a transaction do not typically cause an abort:

Operations on the instruction pointer register, general purpose registers (GPRs) and the status flags (CF, OF, SF, PF, AF, and ZF); and Operations on XMM and YMM registers and the MXCSR register.

However, programmers must be careful when intermixing SSE and AVX operations inside a transactional region. Intermixing SSE instructions accessing XMM registers and AVX instructions accessing YMM registers may cause transactions to abort. Programmers may use REP/REPNE prefixed string operations inside transactions. However, long strings may cause aborts. Further, the use of CLD and STD instructions may cause aborts if they change the value of the DF flag. However, if DF is 1, the STD instruction will not cause an abort. Similarly, if DF is 0, then the CLD instruction will not cause an abort.

Instructions not enumerated here as causing abort when used inside a transaction will typically not cause a transaction to abort (examples include but are not limited to MFENCE, LFENCE, SFENCE, RDTSC, RDTSCP, etc.).

The following instructions will abort transactional execution on any implementation:

XABORT

CPUID

PAUSE

In addition, in some implementations, the following instructions may always cause transactional aborts. These instructions are not expected to be commonly used inside typical transactional regions. However, programmers must not rely on these instructions to force a transactional abort, since whether they cause transactional aborts is implementation dependent.

Operations on X87 and MMX architecture state. This includes all MMX and X87 instructions, including the FXRSTOR and FXSAVE instructions.

Update to non-status portion of EFLAGS: CLI, STI, POPFD, POPFQ, CLTS.

Instructions that update segment registers, debug registers and/or control registers: MOV to DS/ES/FS/GS/SS, POP DS/ES/FS/GS/SS, LDS, LES, LFS, LGS, LSS, SWAPGS, WRFSBASE, WRGSBASE, LGDT, SGDT, LIDT, SIDT, LLDT, SLDT, LTR, STR, Far CALL, Far JMP, Far RET, IRET, MOV to DRx, MOV to CR0/CR2/CR3/CR4/CR8 and LMSW.

Ring transitions: SYSENTER, SYSCALL, SYSEXIT, and SYSRET.

TLB and Cacheability control: CLFLUSH, INVD, WBINVD, INVLPG, INVPCID, and memory instructions with a non-temporal hint (MOVNTDQA, MOVNTDQ, MOVNTI, MOVNTPD, MOVNTPS, and MOVNTQ).

Processor state save: XSAVE, XSAVEOPT, and XRSTOR.

Interrupts: INTn, INTO.

IO: IN, INS, REP INS, OUT, OUTS, REP OUTS and their variants.

VMX: VMPTRLD, VMPTRST, VMCLEAR, VMREAD, VMWRITE, VMCALL, VMLAUNCH, VMRESUME, VMXOFF, VMXON, INVEPT, and INVVPID.

SMX: GETSEC.

UD2, RSM, RDMSR, WRMSR, HLT, MONITOR, MWAIT, XSETBV, VZEROUPPER, MASKMOVQ, and V/MASKMOVDQU.

Runtime Considerations

In addition to the instruction-based considerations, runtime events may cause transactional execution to abort. These may be due to data access patterns or micro-architectural implementation features. The following list is not a comprehensive discussion of all abort causes.

Any fault or trap in a transaction that must be exposed to software will be suppressed. Transactional execution will abort and execution will transition to a non-transactional execution, as if the fault or trap had never occurred. If an exception is not masked, then that un-masked exception will result in a transactional abort and the state will appear as if the exception had never occurred.

Synchronous exception events (#DE, #OF, #NP, #SS, #GP, #BR, #UD, #AC, #XF, #PF, #NM, #TS, #MF, #DB, #BP/INT3) that occur during transactional execution may cause an execution not to commit transactionally, and require a non-transactional execution. These events are suppressed as if they had never occurred. With HLE, since the non-transactional code path is identical to the transactional code path, these events will typically re-appear when the instruction that caused the exception is re-executed non-transactionally, causing the associated synchronous events to be delivered appropriately in the non-transactional execution. Asynchronous events (NMI, SMI, INTR, IPI, PMI, etc.) occurring during transactional execution may cause the transactional execution to abort and transition to a non-transactional execution. The asynchronous events will be pended and handled after the transactional abort is processed.

Transactions only support write-back cacheable memory type operations. A transaction may always abort if the transaction includes operations on any other memory type. This includes instruction fetches to UC memory type.

Memory accesses within a transactional region may require the processor to set the Accessed and Dirty flags of the referenced page table entry. The behavior of how the processor handles this is implementation specific. Some implementations may allow the updates to these flags to become externally visible even if the transactional region subsequently aborts. Some Intel TSX implementations may choose to abort the transactional execution if these flags need to be updated. Further, a processor's page-table walk may generate accesses to its own transactionally written but uncommitted state. Some Intel TSX implementations may choose to abort the execution of a transactional region in such situations. Regardless, the architecture ensures that, if the transactional region aborts, then the transactionally written state will not be made architecturally visible through the behavior of structures such as TLBs.

Executing self-modifying code transactionally may also cause transactional aborts. Programmers must continue to follow the Intel recommended guidelines for writing self-modifying and cross-modifying code even when employing HLE and RTM. While an implementation of RTM and HLE will typically provide sufficient resources for executing common transactional regions, implementation constraints and excessive sizes for transactional regions may cause a transactional execution to abort and transition to a non-transactional execution. The architecture provides no guarantee of the amount of resources available to do transactional execution and does not guarantee that a transactional execution will ever succeed.

Conflicting requests to a cache line accessed within a transactional region may prevent the transaction from executing successfully. For example, if logical processor P0 reads line A in a transactional region and another logical processor P1 writes line A (either inside or outside a transactional region) then logical processor P0 may abort if logical processor P1's write interferes with processor P0's ability to execute transactionally.

Similarly, if P0 writes line A in a transactional region and P1 reads or writes line A (either inside or outside a transactional region), then P0 may abort if P1's access to line A interferes with P0's ability to execute transactionally. In addition, other coherence traffic may at times appear as conflicting requests and may cause aborts. While these false conflicts may happen, they are expected to be uncommon. The conflict resolution policy to determine whether P0 or P1 aborts in the above scenarios is implementation specific.

Generic Transaction Execution embodiments:

According to "ARCHITECTURES FOR TRANSACTIONAL MEMORY", a dissertation submitted to the Department of Computer Science and the Committee on Graduate Studies of Stanford University in partial fulfillment of the requirements for the Degree of Doctor of Philosophy, by Austen McDonald, June 2009, incorporated by reference herein in its entirety, fundamentally, there are three mechanisms needed to implement an atomic and isolated transactional region: versioning, conflict detection, and contention management.

To make a transactional code region appear atomic, all the modifications performed by that transactional code region must be stored and kept isolated from other transactions until commit time. The system does this by implementing a versioning policy. Two versioning paradigms exist: eager and lazy. An eager versioning system stores newly generated transactional values in place and stores previous memory values on the side, in what is called an undo-log. A lazy versioning system stores new values temporarily in what is called a write buffer, copying them to memory only on commit. In either system, the cache is used to optimize storage of new versions.

To ensure that transactions appear to be performed atomically, conflicts must be detected and resolved. The two systems, i.e., the eager and lazy versioning systems, detect conflicts by implementing a conflict detection policy, either optimistic or pessimistic. An optimistic system executes transactions in parallel, checking for conflicts only when a transaction commits. A pessimistic system checks for conflicts at each load and store. Similar to versioning, conflict detection also uses the cache, marking each line as either part of the read-set, part of the write-set, or both. The two systems resolve conflicts by implementing a contention management policy. Many contention management policies exist, some are more appropriate for optimistic conflict detection and some are more appropriate for pessimistic. Described below are some example policies.

Since each transactional memory (TM) system needs both versioning detection and conflict detection, these options give rise to four distinct TM designs: Eager-Pessimistic (EP), Eager-Optimistic (EO), Lazy-Pessimistic (LP), and Lazy-Optimistic (LO). Table 2 briefly describes all four distinct TM designs.

Figure 1:
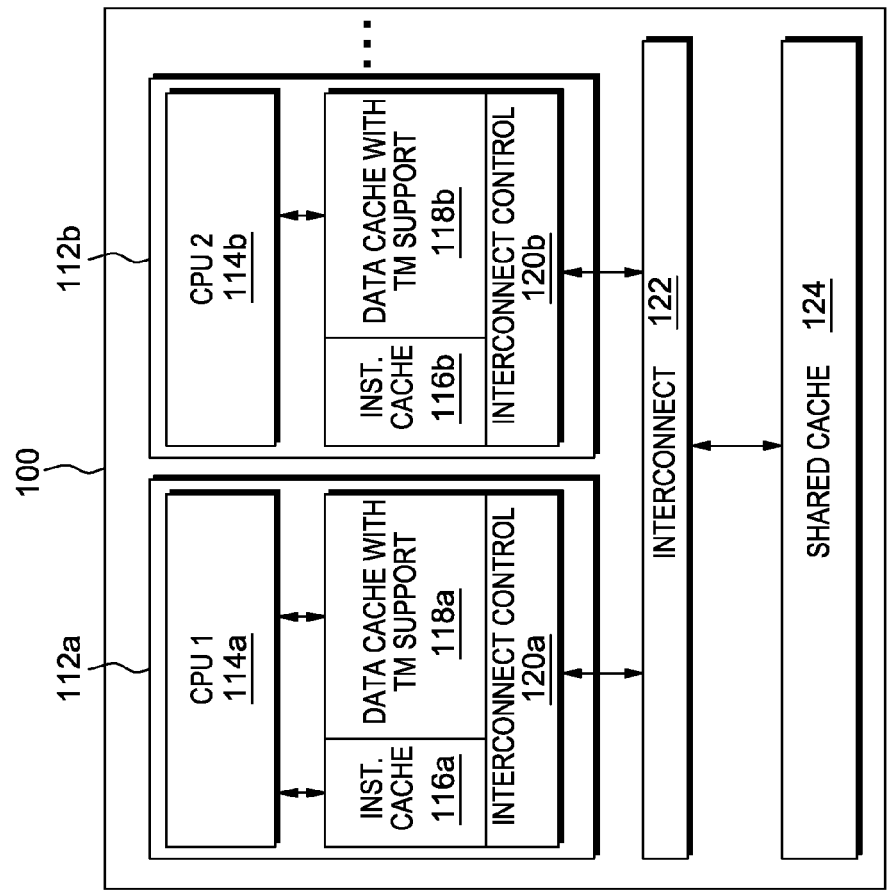

FIGS. 1 and 2 depict block diagrams of an example multi-core Transactional Memory environment, in accordance with embodiments of the present disclosure. FIG. 1 shows many TM-enabled CPUs (CPU1 114a, CPU2 114b, etc.) on one die 100, connected with an interconnect 122, under management of an interconnect control 120a, 120b. Each CPU 114a, 114b (also known as a Processor) may have a split cache consisting of an Instruction Cache 116a, 166b for caching instructions from memory to be executed and a Data Cache 118a, 118b with TM support for caching data (operands) of memory locations to be operated on by CPU 114a, 114b (in FIG. 1, each CPU 114a, 114b and its associated caches are referenced as 112a, 112b). In an implementation, caches of multiple dies, such as multiple die 100, are interconnected to support cache coherency between the caches of multiple instances of die 100. In an implementation, a single cache, rather than the split cache is employed holding both instructions and data. In implementations, the CPU caches are one level of caching in a hierarchical cache structure. For example each die 100 may employ a shared cache 124 to be shared amongst all the CPUs on the die 100. In another implementation, each die 100 may have access to a common shared cache 124, which is shared amongst all the processors of the multiple instances of die 100.

FIG. 2 shows the details of an example transactional CPU environment 112, having a CPU 114, including additions to support TM. Transactional CPU (processor) 114 may include hardware for supporting Register Checkpoints 126 and special TM Registers 128. The transactional CPU cache may have the MESI bits 130, Tags 140 and Data 142 of a conventional cache but also, for example, R bits 132 showing a line has been read by CPU 114 while executing a transaction and W bits 138 showing a line has been written-to by CPU 114 while executing a transaction.

A key detail for programmers in any TM system is how non-transactional accesses interact with transactions. By design, transactional accesses are screened from each other using the mechanisms above. However, the interaction between a regular, non-transactional load with a transaction containing a new value for that address must still be considered. In addition, the interaction between a non-transactional store with a transaction that has read that address must also be explored. These are issues of the database concept isolation.

A TM system is said to implement strong isolation, sometimes called strong atomicity, when every non-transactional load and store acts like an atomic transaction. Therefore, non-transactional loads cannot see uncommitted data and non-transactional stores cause atomicity violations in any transactions that have read that address. A system where this is not the case is said to implement weak isolation, sometimes called weak atomicity.

Strong isolation is often more desirable than weak isolation due to the relative ease of conceptualization and implementation of strong isolation. Additionally, if a programmer has forgotten to surround some shared memory references with transactions, causing bugs, then with strong isolation, the programmer will often detect that oversight using a simple debug interface because the programmer will see a non-transactional region causing atomicity violations. Also, programs written in one model may work differently on another model.

Further, strong isolation is often easier to support in hardware TM than weak isolation. With strong isolation, since the coherence protocol already manages load and store communication between processors, transactions can detect non-transactional loads and stores and act appropriately. To implement strong isolation in software Transactional Memory (TM), non-transactional code must be modified to include read- and write-barriers; potentially crippling performance. Although great effort has been expended to remove many un-needed barriers, such techniques are often complex and performance is typically far lower than that of HTMs.

TABLE 2

Transactional Memory Design Space

| | | VERSIONING | |
|---|---|---|---|
| | | Lazy | Eager |
| CONFLICT DETECTION | Optimistic | Storing updates in a write buffer; detecting conflicts at commit time. | Not practical: waiting to update memory until commit time but detecting conflicts at access time guarantees wasted work and provides no advantage |
| | Pessimistic | Storing updates in a write buffer; detecting conflicts at access time. | Updating memory, keeping old values in undo log; detecting conflicts at access time. |

Table 2 illustrates the fundamental design space of transactional memory (versioning and conflict detection).

Eager-Pessimistic (EP)

This first TM design described below is known as Eager-Pessimistic. An EP system stores its write-set "in place" (hence the name "eager") and, to support rollback, stores the old values of overwritten lines in an "undo log". Processors use W 138 and R 132 cache bits to track read and write-sets and detect conflicts when receiving snooped load requests. Perhaps the most notable examples of EP systems in known literature are LogTM and UTM.

Beginning a transaction in an EP system is much like beginning a transaction in other systems: tm_begin( ) takes a register checkpoint, and initializes any status registers. An EP system also requires initializing the undo log, the details of which are dependent on the log format, but often involve initializing a log base pointer to a region of pre-allocated, thread-private memory, and clearing a log bounds register.

Versioning: In EP, due to the way eager versioning is designed to function, MESI 130 state transitions (cache line indicators corresponding to Modified, Exclusive, Shared, and Invalid code states) are left mostly unchanged. Outside of a transaction, MESI 130 state transitions are left completely unchanged. When reading a line inside a transaction, the standard coherence transitions apply (S (Shared)→S, I (Invalid)→S, or I→E (Exclusive)), issuing a load miss as needed, but R 132 bit is also set. Likewise, writing a line applies the standard transitions (S→M, E→I, I→M), issuing a miss as needed, but also sets W 138 (Written) bit. The first time a line is written, the old version of the entire line is loaded then written to the undo log to preserve it in case the current transaction aborts. The newly written data is then stored "in-place," over the old data.

Conflict Detection: Pessimistic conflict detection uses coherence messages exchanged on misses, or upgrades, to look for conflicts between transactions. When a read miss occurs within a transaction, other processors receive a load request; but they ignore the request if they do not have the needed line. If the other processors have the needed line non-speculatively or have line R 132 (Read), they downgrade that line to S, and in certain cases issue a cache-to-cache transfer if they have the line in MESI's 130 M or E state. However, if the cache has the line W 138, then a conflict is detected between the two transactions and additional action(s) must be taken.

Similarly, when a transaction seeks to upgrade a line from shared to modified (on a first write), the transaction issues an exclusive load request, which is also used to detect conflicts. If a receiving cache has the line non-speculatively, then the line is invalidated, and in certain cases a cache-to-cache transfer (M or E states) is issued. But, if the line is R 132 or W 138, a conflict is detected.

Validation: Because conflict detection is performed on every load, a transaction always has exclusive access to its own write-set. Therefore, validation does not require any additional work.

Commit: Since eager versioning stores the new version of data items in place, the commit process simply clears W 138 and R 132 bits and discards the undo log.

Abort: When a transaction rolls back, the original version of each cache line in the undo log must be restored, a process called "unrolling" or "applying" the log. This is done during tm_discard( ) and must be atomic with regard to other transactions. Specifically, the write-set must still be used to detect conflicts: this transaction has the only correct version of lines in its undo log, and requesting transactions must wait for the correct version to be restored from that log. Such a log can be applied using a hardware state machine or software abort handler.

Eager-Pessimistic has the characteristics of: Commit is simple and since it is in-place, very fast. Similarly, validation is a no-op. Pessimistic conflict detection detects conflicts early, thereby reducing the number of "doomed" transactions. For example, if two transactions are involved in a Write-After-Read dependency, then that dependency is detected immediately in pessimistic conflict detection. However, in optimistic conflict detection such conflicts are not detected until the writer commits.

Eager-Pessimistic also has the characteristics of: As described above, the first time a cache line is written, the old value must be written to the log, incurring extra cache accesses. Aborts are expensive as they require undoing the log. For each cache line in the log, a load must be issued, perhaps going as far as main memory before continuing to the next line. Pessimistic conflict detection also prevents certain serializable schedules from existing.

Additionally, because conflicts are handled as they occur, there is a potential for livelock and careful contention management mechanisms must be employed to guarantee forward progress.

Lazy-Optimistic (LO)

Another popular TM design is Lazy-Optimistic (LO), which stores its write-set in a "write buffer" or "redo log" and detects conflicts at commit time (still using R 132 and W 138 bits).

Versioning: Just as in the EP system, the MESI protocol of the LO design is enforced outside of the transactions. Once inside a transaction, reading a line incurs the standard MESI transitions but also sets R 132 bit. Likewise, writing a line sets W 138 bit of the line, but handling the MESI transitions of the LO design is different from that of the EP design. First, with lazy versioning, the new versions of written data are stored in the cache hierarchy until commit while other transactions have access to old versions available in memory or other caches. To make available the old versions, dirty lines (M lines) must be evicted when first written by a transaction. Second, no upgrade misses are needed because of the optimistic conflict detection feature: if a transaction has a line in the S state, it can simply write to it and upgrade that line to an M state without communicating the changes with other transactions because conflict detection is done at commit time.

Conflict Detection and Validation: To validate a transaction and detect conflicts, LO communicates the addresses of speculatively modified lines to other transactions only when it is preparing to commit. On validation, the processor sends one, potentially large, network packet containing all the addresses in the write-set. Data is not sent, but left in the cache of the committer and marked dirty (M). To build this packet without searching the cache for lines marked W, a simple bit vector is used, called a "store buffer," with one bit per cache line to track these speculatively modified lines. Other transactions use this address packet to detect conflicts: if an address is found in the cache and R 132 and/or W 138 bits are set, then a conflict is initiated. If the line is found but neither R 132 nor W 138 is set, then the line is simply invalidated, which is similar to processing an exclusive load.

To support transaction atomicity, these address packets must be handled atomically, i.e., no two address packets may exist at once with the same addresses. In an LO system, this can be achieved by simply acquiring a global commit token before sending the address packet. However, a two-phase commit scheme could be employed by first sending out the address packet, collecting responses, enforcing an ordering protocol (perhaps oldest transaction first), and committing once all responses are satisfactory.

Commit: Once validation has occurred, commit needs no special treatment: simply clear W 138 and R 132 bits and the store buffer. The transaction's writes are already marked dirty in the cache and other caches' copies of these lines have been invalidated via the address packet. Other processors can then access the committed data through the regular coherence protocol.

Abort: Rollback is equally easy: because the write-set is contained within the local caches, these lines can be invalidated, then clear W 138 and R 132 bits and the store buffer. The store buffer allows W lines to be found to invalidate without the need to search the cache.

Lazy-Optimistic has the characteristics of: Aborts are very fast, requiring no additional loads or stores and making only local changes. More serializable schedules can exist than found in EP, which allows an LO system to more aggressively speculate that transactions are independent, which can yield higher performance. Finally, the late detection of conflicts can increase the likelihood of forward progress.

Lazy-Optimistic also has the characteristics of: Validation takes global communication time proportional to size of write set. Doomed transactions can waste work since conflicts are detected only at commit time.

Lazy-Pessimistic (LP)

Lazy-Pessimistic (LP) represents a third TM design option, sitting somewhere between EP and LO: storing newly written lines in a write buffer but detecting conflicts on a per access basis.

Versioning: Versioning is similar but not identical to that of LO: reading a line sets its R bit 132, writing a line sets its W bit 138, and a store buffer is used to track W lines in the cache. Also, dirty (M) lines must be evicted when first written by a transaction, just as in LO. However, since conflict detection is pessimistic, load exclusives must be performed when upgrading a transactional line from I, S→M, which is unlike LO.

Conflict Detection: LP's conflict detection operates the same as EP's: using coherence messages to look for conflicts between transactions.

Validation: Like in EP, pessimistic conflict detection ensures that at any point, a running transaction has no conflicts with any other running transaction, so validation is a no-op.

Commit: Commit needs no special treatment: simply clear W 138 and R 132 bits and the store buffer, like in LO.

Abort: Rollback is also like that of LO: simply invalidate the write-set using the store buffer and clear the W and R bits and the store buffer.

Eager-Optimistic (EO)

The LP has the characteristics of: Like LO, aborts are very fast. Like EP, the use of pessimistic conflict detection reduces the number of "doomed" transactions Like EP, some serializable schedules are not allowed and conflict detection must be performed on each cache miss.

The final combination of versioning and conflict detection is Eager-Optimistic (EO). EO may be a less than optimal choice for HTM systems: since new transactional versions are written in-place, other transactions have no choice but to notice conflicts as they occur (i.e., as cache misses occur). But since EO waits until commit time to detect conflicts, those transactions become "zombies," continuing to execute, wasting resources, yet are "doomed" to abort.

EO has proven to be useful in STMs and is implemented by Bartok-STM and McRT. A lazy versioning STM needs to check its write buffer on each read to ensure that it is reading the most recent value. Since the write buffer is not a hardware structure, this is expensive, hence the preference for write-in-place eager versioning. Additionally, since checking for conflicts is also expensive in an STM, optimistic conflict detection offers the advantage of performing this operation in bulk.

Contention Management

How a transaction rolls back once the system has decided to abort that transaction has been described above, but, since a conflict involves two transactions, the topics of which transaction should abort, how that abort should be initiated, and when should the aborted transaction be retried need to be explored. These are topics that are addressed by Contention Management (CM), a key component of transactional memory. Described below are policies regarding how the systems initiate aborts and the various established methods of managing which transactions should abort in a conflict.

Contention Management Policies

A Contention Management (CM) Policy is a mechanism that determines which transaction involved in a conflict should abort and when the aborted transaction should be retried. For example, it is often the case that retrying an aborted transaction immediately does not lead to the best performance. Conversely, employing a back-off mechanism, which delays the retrying of an aborted transaction, can yield better performance. STMs first grappled with finding the best contention management policies and many of the policies outlined below were originally developed for STMs.

CM Policies draw on a number of measures to make decisions, including ages of the transactions, size of read- and write-sets, the number of previous aborts, etc. The combinations of measures to make such decisions are endless, but certain combinations are described below, roughly in order of increasing complexity.

To establish some nomenclature, first note that in a conflict there are two sides: the attacker and the defender. The attacker is the transaction requesting access to a shared memory location. In pessimistic conflict detection, the attacker is the transaction issuing the load or load exclusive. In optimistic, the attacker is the transaction attempting to validate. The defender in both cases is the transaction receiving the attacker's request.

An Aggressive CM Policy immediately and always retries either the attacker or the defender. In LO, Aggressive means that the attacker always wins, and so Aggressive is sometimes called committer wins. Such a policy was used for the earliest LO systems. In the case of EP, Aggressive can be either defender wins or attacker wins.

Restarting a conflicting transaction that will immediately experience another conflict is bound to waste work—namely interconnect bandwidth refilling cache misses. A Polite CM Policy employs exponential backoff (but linear could also be used) before restarting conflicts. To prevent starvation, a situation where a process does not have resources allocated to it by the scheduler, the exponential backoff greatly increases the odds of transaction success after some n retries.

Another approach to conflict resolution is to randomly abort the attacker or defender (a policy called Randomized). Such a policy may be combined with a randomized backoff scheme to avoid unneeded contention.

However, making random choices, when selecting a transaction to abort, can result in aborting transactions that have completed "a lot of work", which can waste resources. To avoid such waste, the amount of work completed on the transaction can be taken into account when determining which transaction to abort. One measure of work could be a transaction's age. Other methods include Oldest, Bulk TM, Size Matters, Karma, and Polka. Oldest is a simple timestamp method that aborts the younger transaction in a conflict. Bulk TM uses this scheme. Size Matters is like Oldest but instead of transaction age, the number of read/written words is used as the priority, reverting to Oldest after a fixed number of aborts. Karma is similar, using the size of the write-set as priority. Rollback then proceeds after backing off a fixed amount of time. Aborted transactions keep their priorities after being aborted (hence the name Karma). Polka works like Karma but instead of backing off a predefined amount of time, it backs off exponentially more each time.

Since aborting wastes work, it is logical to argue that stalling an attacker until the defender has finished their transaction would lead to better performance. Unfortunately, such a simple scheme easily leads to deadlock.

Deadlock avoidance techniques can be used to solve this problem. Greedy uses two rules to avoid deadlock. The first rule is, if a first transaction, T1, has lower priority than a second transaction, T0, or if T1 is waiting for another transaction, then T1 aborts when conflicting with T0. The second rule is, if T1 has higher priority than T0 and is not waiting, then T0 waits until T1 commits, aborts, or starts waiting (in which case the first rule is applied). Greedy provides some guarantees about time bounds for executing a set of transactions. One EP design (LogTM) uses a CM policy similar to Greedy to achieve stalling with conservative deadlock avoidance.

Example MESI coherency rules provide for four possible states in which a cache line of a multiprocessor cache system may reside, M, E, S, and I, defined as follows:

Modified (M): The cache line is present only in the current cache, and is dirty; it has been modified from the value in main memory. The cache is required to write the data back to main memory at some time in the future, before permitting any other read of the (no longer valid) main memory state. The write-back changes the line to the Exclusive state.

Exclusive (E): The cache line is present only in the current cache, but is clean; it matches main memory. It may be changed to the Shared state at any time, in response to a read request. Alternatively, it may be changed to the Modified state when writing to it.

Shared (S): Indicates that this cache line may be stored in other caches of the machine and is "clean"; it matches the main memory. The line may be discarded (changed to the Invalid state) at any time.

Invalid (I): Indicates that this cache line is invalid (unused).

TM coherency status indicators (R 132, W 138) may be provided for each cache line, in addition to, or encoded in the MESI coherency bits. An R 132 indicator indicates the current transaction has read from the data of the cache line, and a W 138 indicator indicates the current transaction has written to the data of the cache line.

In another aspect of TM design, a system is designed using transactional store buffers. U.S. Pat. No. 6,349,361 titled "Methods and Apparatus for Reordering and Renaming Memory References in a Multiprocessor Computer System," filed Mar. 31, 2000 and incorporated by reference herein in its entirety, teaches a method for reordering and renaming memory references in a multiprocessor computer system having at least a first and a second processor. The first processor has a first private cache and a first buffer, and the second processor has a second private cache and a second buffer. The method includes the steps of, for each of a plurality of gated store requests received by the first processor to store a datum, exclusively acquiring a cache line that contains the datum by the first private cache, and storing the datum in the first buffer. Upon the first buffer receiving a load request from the first processor to load a particular datum, the particular datum is provided to the first processor from among the data stored in the first buffer based on an in-order sequence of load and store operations. Upon the first cache receiving a load request from the second cache for a given datum, an error condition is indicated and a current state of at least one of the processors is reset to an earlier state when the load request for the given datum corresponds to the data stored in the first buffer.

The main implementation components of one such transactional memory facility are a transaction-backup register file for holding pre-transaction GR (general register) content, a cache directory to track the cache lines accessed during the transaction, a store cache to buffer stores until the transaction ends, and firmware routines to perform various complex functions. In this section a detailed implementation is described.

IBM zEnterprise EC12 Enterprise Server Embodiment

The IBM zEnterprise EC12 enterprise server introduces transactional execution (TX) in transactional memory, and is described in part in a paper, "Transactional Memory Architecture and Implementation for IBM System z" of Proceedings Pages 25-36 presented at MICRO-45, 1-5 Dec. 2012, Vancouver, British Columbia, Canada, available from IEEE Computer Society Conference Publishing Services (CPS), which is incorporated by reference herein in its entirety.

Table 3 shows an example transaction. Transactions started with TBEGIN are not assured to ever successfully complete with TEND, since they can experience an aborting condition at every attempted execution, e.g., due to repeating conflicts with other CPUs. This requires that the program support a fallback path to perform the same operation non-transactionally, e.g., by using traditional locking schemes. This puts significant burden on the programming and software verification teams, especially where the fallback path is not automatically generated by a reliable compiler.

TABLE 3

Example Transaction Code

|  | LHI | R0,0 | *initialize retry count=0 |
|---|---|---|---|
| loop | TBEGIN |  | *begin transaction |
|  | JNZ | abort | *go to abort code if CC1=0 |
|  | LT | R1, lock | *load and test the fallback lock |
|  | JNZ | lckbzy | *branch if lock busy |
|  | ... perform operation ... | | |
|  | TEND |  | *end transaction |
|  | ... ... | ... ... | |
| lckbzy | TABORT |  | *abort if lock busy; this |
|  |  |  | *resumes after TBEGIN |
| abort | JO | fallback | *no retry if CC=3 |
|  | AHI | R0, 1 | *increment retry count |
|  | CIJNL | R0,6, fallback | *give up after 6 attempts |
|  | PPA | R0, TX | *random delay based on retry count |
|  | ... potentially wait for lock to become free ... | | |
|  | J | loop | *jump back to retryfallback |
|  | OBTAIN | lock | *using Compare&Swap |
|  | ... perform operation ... | | |
|  | RELEASE | lock | |
|  | ... ... | ... ... | |

The requirement of providing a fallback path for aborted Transaction Execution (TX) transactions can be onerous. Many transactions operating on shared data structures are expected to be short, touch only a few distinct memory locations, and use simple instructions only. For those transactions, the IBM zEnterprise EC12 introduces the concept of constrained transactions; under normal conditions, CPU 114 (FIG. 2) assures that constrained transactions eventually end successfully, albeit without giving a strict limit on the number of necessary retries. A constrained transaction starts with a TBEGINC instruction and ends with a regular TEND. Implementing a task as a constrained or non-constrained transaction typically results in very comparable performance, but constrained transactions simplify software development by removing the need for a fallback path. IBM's Transactional Execution architecture is further described in z/Architecture, Principles of Operation, Tenth Edition, SA22-7832-09 published September 2012 from IBM, incorporated by reference herein in its entirety.

A constrained transaction starts with the TBEGINC instruction. A transaction initiated with TBEGINC must follow a list of programming constraints; otherwise the program takes a non-filterable constraint-violation interruption. Exemplary constraints may include, but not be limited to: the transaction can execute a maximum of 32 instructions, all instruction text must be within 256 consecutive bytes of memory; the transaction contains only forward-pointing relative branches (i.e., no loops or subroutine calls); the transaction can access a maximum of 4 aligned octowords (an octoword is 32 bytes) of memory; and restriction of the instruction-set to exclude complex instructions like decimal or floating-point operations. The constraints are chosen such that many common operations like doubly linked list-insert/ delete operations can be performed, including the very powerful concept of atomic compare-and-swap targeting up to 4 aligned octowords. At the same time, the constraints were chosen conservatively such that future CPU implementations can assure transaction success without needing to adjust the constraints, since that would otherwise lead to software incompatibility.

TBEGINC mostly behaves like XBEGIN in TSX or TBEGIN on IBM's zEC12 servers, except that the floating-point register (FPR) control and the program interruption filtering fields do not exist and the controls are considered to be zero. On a transaction abort, the instruction address is set back directly to the TBEGINC instead of to the instruction after, reflecting the immediate retry and absence of an abort path for constrained transactions.

Nested transactions are not allowed within constrained transactions, but if a TBEGINC occurs within a non-constrained transaction it is treated as opening a new non-constrained nesting level just like TBEGIN would. This can occur, e.g., if a non-constrained transaction calls a subroutine that uses a constrained transaction internally.

Since interruption filtering is implicitly off, all exceptions during a constrained transaction lead to an interruption into the operating system (OS). Eventual successful finishing of the transaction relies on the capability of the OS to page-in the at most 4 pages touched by any constrained transaction. The OS must also ensure time-slices long enough to allow the transaction to complete.

TABLE 4

Transaction Code Example

| | |
|---|---|
| TBEGINC | *begin constrained transaction |
| ... perform operation ... | |
| TEND | *end transaction |

Table 4 shows the constrained-transactional implementation of the code in Table 3, assuming that the constrained transactions do not interact with other locking-based code. No lock testing is shown therefore, but could be added if constrained transactions and lock-based code were mixed.

When failure occurs repeatedly, software emulation is performed using millicode as part of system firmware. Advantageously, constrained transactions have desirable properties because of the burden removed from programmers.

Figure 3:
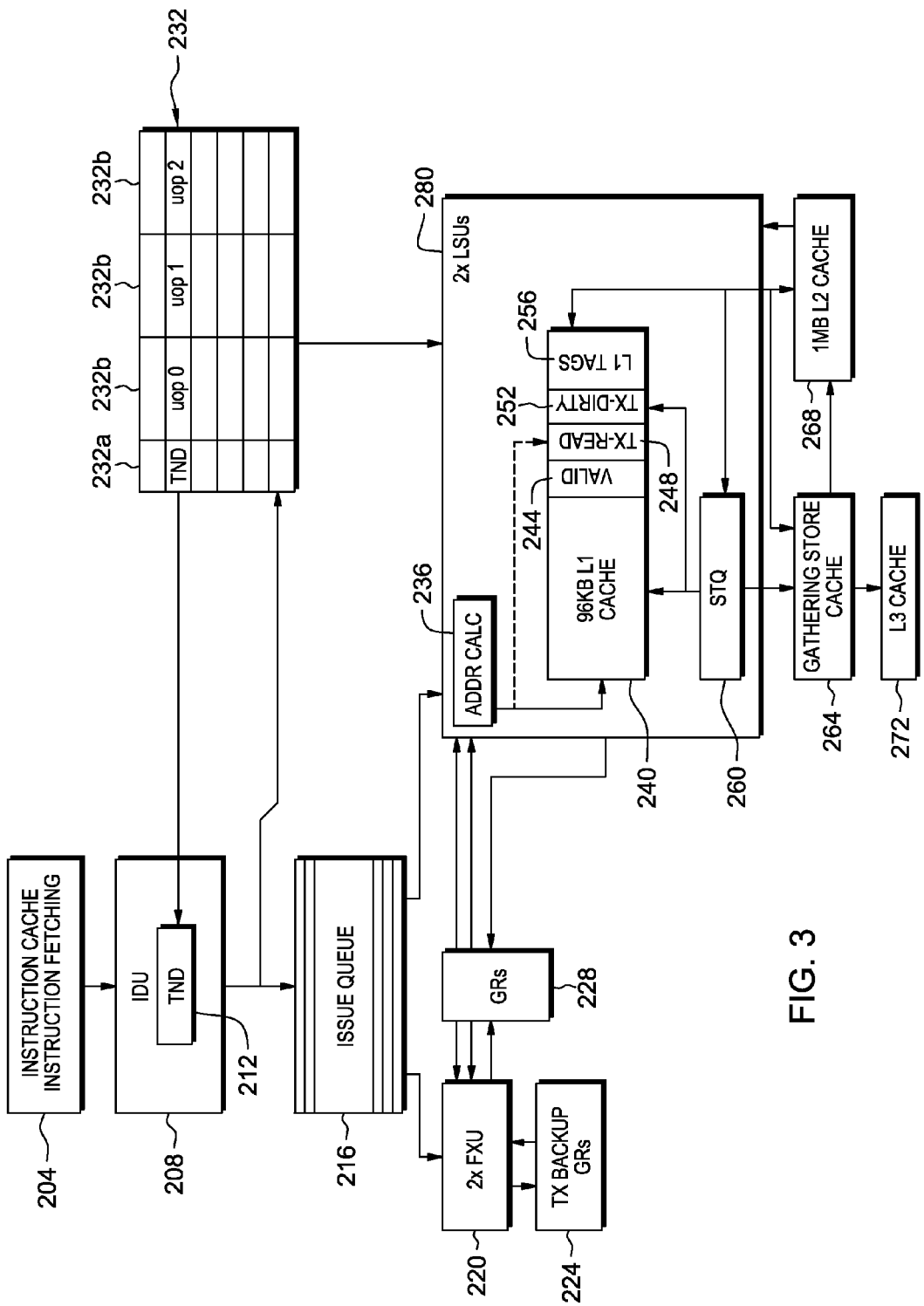
FIG. 3 depicts a block diagram including example components of an example CPU, in accordance with embodiments of the present disclosure.

With reference to FIG. 3, the IBM zEnterprise EC12 processor introduced the transactional execution facility. The processor can decode 3 instructions per clock cycle; simple instructions are dispatched as single micro-ops, and more complex instructions are cracked into multiple micro-ops. The micro-ops (Uops 232b) are written into a unified issue queue 216, from where they can be issued out-of-order. Up to two fixed-point, one floating-point, two load/store, and two branch instructions can execute every cycle. A Global Completion Table (GCT) 232 holds every micro-op 232b and a transaction nesting depth (TND) 232a. GCT 232 is written in-order at decode time, tracks the execution status of each micro-op 232b, and completes instructions when all micro-ops 232b of the oldest instruction group have successfully executed.

Level 1 (L1) 240 is a data cache. L1 240 is a 96 KB (kilo-byte) 6-way associative cache with 256 byte cache-lines and 4 cycle use latency, coupled to a private 1 MB (megabyte) 8-way associative 2nd-level (L2) 268. L2 268 is a data cache with 7 cycles use-latency penalty for L1 240 misses. L1 240 is the cache closest to a processor and Ln cache is a cache at the nth level of caching. Both L1 240 and L2 268 are store-through caches. Six cores on each central processor (CP) chip share a 48 MB 3rd-level store-in cache, and six CP chips are connected to an off-chip 384 MB 4th-level cache, packaged together on a glass ceramic multi-chip module (MCM). Up to 4 multi-chip modules (MCMs) can be connected to a coherent symmetric multi-processor (SMP) system with up to 144 cores (not all cores are available to run customer workload).

Coherency is managed with a variant of the MESI protocol. Cache-lines can be owned read-only (shared) or exclusive; L1 240 and L2 268 are store-through caches and thus do not contain dirty lines. L3 272 and L4 cache (not shown) are store-in and track dirty states. Each cache is inclusive of all its connected lower level caches.

Coherency requests are called "cross interrogates" (XI) and are sent hierarchically from higher level to lower-level caches, and between the L4s. When one core misses the L1 240 and L2 268 and requests the cache line from its local L3 272, L3 272 checks whether it owns the line, and if necessary sends an XI to the currently owning L2 268/L1 240 under that L3 272 to ensure coherency, before it returns the cache line to the requestor. If the request also misses the L3 272, then L3 272 sends a request to the L4 cache (not shown), which enforces coherency by sending XIs to all necessary L3s under that L4, and to the neighboring L4s. Then the L4 responds to the requesting L3 which forwards the response to L2 268/L1 240.

Note that due to the inclusivity rule of the cache hierarchy, sometimes cache lines are XI'ed from lower-level caches due to evictions on higher-level caches caused by associativity overflows from requests to other cache lines. These XIs can be called "LRU XIs", where LRU stands for least recently used.

Making reference to yet another type of XI requests, Demote-XIs transition cache-ownership from exclusive into read-only state, and Exclusive-XIs transition cache ownership from exclusive into invalid state. Demote-XIs and Exclusive-XIs need a response back to the XI sender. The target cache can "accept" the XI, or send a "reject" response if it first needs to evict dirty data before accepting the XI. L1 240/L2 268 caches are store through, but may reject demote-XIs and exclusive XIs if they have stores in their store queues that need to be sent to L3 before downgrading the exclusive state. A rejected XI will be repeated by the sender. Read-only-XIs are sent to caches that own the line read-only; no response is needed for such XIs since they cannot be rejected. The details of the SMP protocol are similar to those described for the IBM z10 by P. Mak, C. Walters, and G. Strait, in "IBM System z10 processor cache subsystem microarchitecture", IBM Journal of Research and Development, Vol 53:1, 2009, which is incorporated by reference herein in its entirety.

Transactional Instruction Execution

FIG. 3 depicts example components of an example CPU environment 112, including a CPU 114 and caches/components with which it interacts (such as those depicted in FIGS. 1 and 2). Instruction decode unit (IDU) 208 keeps track of the current transaction nesting depth (TND) 212. When IDU 208 receives a TBEGIN instruction, TND 212 is incremented, and conversely decremented on TEND instructions. TND 212 is written into GCT 232 for every dispatched instruction. When a TBEGIN or TEND is decoded on a speculative path that later gets flushed, TND 212 of IDU 208 is refreshed from the youngest GCT 232 entry that is not flushed. The transactional state is also written into issue queue 216 for consumption by the execution units, mostly by Load/Store Unit (LSU) 280, which also has an effective address calculator 236 that is included in LSU 280. The TBEGIN instruction may specify a transaction diagnostic block (TDB) for recording status information, should the transaction abort before reaching a TEND instruction.

Similar to the nesting depth, IDU 208/GCT 232 collaboratively track the access register/floating-point register (AR/FPR) modification masks through the transaction nest; IDU 208 can place an abort request into GCT 232 when an AR/FPR-modifying instruction is decoded and the modification mask blocks that. When the instruction becomes next-to-complete, completion is blocked and the transaction aborts. Other restricted instructions are handled similarly, including TBEGIN if decoded while in a constrained transaction, or exceeding the maximum nesting depth.

An outermost TBEGIN is cracked into multiple micro-ops depending on the GR-Save-Mask; each micro-op 232b (including, for example uop 0, uop 1, and uop2) will be executed by one of the two fixed point units (FXUs) 220 to save a pair of GR 228 into a special transaction-backup register file 224, that is used to later restore the content of the pair of GR 228 in case of a transaction abort. Also, the TBEGIN spawns micro-ops 232b to perform an accessibility test for the TDB if one is specified; the address is saved in a special purpose register for later usage in the abort case. At the decoding of an outermost TBEGIN, the instruction address and the instruction text of the TBEGIN are also saved in special purpose registers for a potential abort processing later on.

TEND and NTSTG are single micro-op 232b instructions; NTSTG (non-transactional store) is handled like a normal store except that it is marked as non-transactional in issue queue 216 so that LSU 280 can treat it appropriately. TEND is a no-op at execution time, the ending of the transaction is performed when TEND completes.

As mentioned, instructions that are within a transaction are marked as such in issue queue 216, but otherwise execute mostly unchanged; LSU 280 performs isolation tracking as described in the next section.

Since decoding is in-order, and since IDU 208 keeps track of the current transactional state and writes it into issue queue 216 along with every instruction from the transaction, execution of TBEGIN, TEND, and instructions before, within, and after the transaction can be performed out-of order. It is even possible (though unlikely) that TEND is executed first, then the entire transaction, and lastly the TBEGIN executes. Program order is restored through GCT 232 at completion time. The length of transactions is not limited by the size of GCT 232, since a general purpose register (GR) 228 can be restored from backup register file 224.

During execution, the program event recording (PER) events are filtered based on the Event Suppression Control, and a PER TEND event is detected if enabled. Similarly, while in transactional mode, a pseudo-random generator may be causing the random aborts as enabled by the Transaction Diagnostics Control.

Tracking for Transactional Isolation

Load/Store Unit 280 tracks cache lines that were accessed during transactional execution, and triggers an abort if an XI from another CPU (or an LRU-XI) conflicts with the footprint. If the conflicting XI is an exclusive or demote XI, LSU 280 rejects the XI back to L3 272 in the hope of finishing the transaction before L3 272 repeats the XI. This "stiff-arming" is very efficient in highly contended transactions. In order to prevent hangs when two CPUs stiff-arm each other, a XI-reject counter is implemented, which triggers a transaction abort when a threshold is met.

L1 cache directory 240 is traditionally implemented with static random access memories (SRAMs). For the transactional memory implementation, valid bits 244 (64 rows×6 ways) of the directory have been moved into normal logic latches, and are supplemented with two more bits per cache line: TX-read 248 and TX-dirty 252 bits.

TX-read 248 bits are reset when a new outermost TBEGIN is decoded (which is interlocked against a prior still pending transaction). A TX-read 248 bit is set at execution time by every load instruction that is marked "transactional" in the issue queue. Note that this can lead to over-marking if speculative loads are executed, for example on a mispredicted branch path. The alternative of setting the TX-read 248 bit at load completion time was too expensive for silicon area, since multiple loads can complete at the same time, requiring many read-ports on the load-queue.

Stores execute the same way as in non-transactional mode, but a transaction mark is placed in store queue (STQ) 260 entry of the store instruction. At write-back time, when the data from STQ 260 is written into L1 240, a TX-dirty bit 252 in L1-directory 256 is set for the written cache line. Store write-back into L1 240 occurs only after the store instruction has completed, and at most one store is written back per cycle. Before completion and write-back, loads can access the data from STQ 260 by means of store-forwarding; after write-back, CPU 114 (FIG. 2) can access the speculatively updated data in L1 Cache 240. If the transaction ends successfully, the respective TX-dirty bit 252 of all cache-lines are cleared, and also the TX-marks of not yet written stores are cleared in STQ 260, effectively turning the pending stores into normal stores.

On a transaction abort, all pending transactional stores are invalidated from STQ 260, even those already completed. All cache lines that were modified by the transaction in L1 Cache 240, that is, have TX-dirty bit 252 on, have their valid bits turned off, effectively removing them from L1 Cache 240 cache instantaneously.

The architecture requires that before completing a new instruction, the isolation of the transaction read- and write-set is maintained. This isolation is ensured by stalling instruction completion at appropriate times when XIs are pending; speculative out-of order execution is allowed, optimistically assuming that the pending XIs are to different addresses and not actually cause a transaction conflict. This design fits very naturally with the XI-vs-completion interlocks that are implemented on prior systems to ensure the strong memory ordering that the architecture requires.

When L1 Cache 240 receives an XI, L1 Cache 240 accesses the directory to check validity of the XI'ed address in L1 Cache 240, and if TX-read bit 248 is active on the XI'ed line and the XI is not rejected, LSU 280 triggers an abort. When a cache line with active TX-read bit 248 is LRU'ed from L1 Cache 240, a special LRU-extension vector remembers for each of the 64 rows of L1 Cache 240 that a TX-read line existed on that row. Since no precise address tracking exists for the LRU extensions, any non-rejected XI that hits a valid extension row LSU 280 triggers an abort. Providing the LRU-extension effectively increases the read footprint capability from the L1-size to the L2-size and associativity, provided no conflicts with other CPUs 114 (FIGS. 1 and 2) against the non-precise LRU-extension tracking causes of aborts.

The store footprint is limited by the store cache size (the store cache is discussed in more detail below) and thus implicitly by the size and associativity of L2 Cache 268. No LRU-extension action needs to be performed when a TX-dirty 252 cache line is LRU'ed from L1 Cache 240.

Store Cache

In prior systems, since L1 Cache 240 and L2 Cache 268 are store-through caches, every store instruction causes an L3 272 store access; with now 6 cores per L3 272 and further improved performance of each core, the store rate for L3 272 (and to a lesser extent for L2 Cache 268) becomes problematic for certain workloads. In order to avoid store queuing delays, a gathering store cache 264 had to be added, that combines stores to neighboring addresses before sending them to L3 272.

For transactional memory performance, it is acceptable to invalidate every TX-dirty 252 cache line from L1 Cache 240 on transaction aborts, because L2 Cache 268 cache is very close (7 cycles L1 Cache 240 miss penalty) to bring back the clean lines. However, it would be unacceptable for performance (and silicon area for tracking) to have transactional stores write L2 Cache 268 before the transaction ends and then invalidate all dirty L2 Cache 268 cache lines on abort (or even worse on the shared L3 272).

The two problems of store bandwidth and transactional memory store handling can both be addressed with the gathering of store cache 264. Store cache 264 is a circular queue of 64 entries, each entry holding 128 bytes of data with byte-precise valid bits. In non-transactional operation, when a store is received from LSU 280, the store cache 264 checks whether an entry exists for the same address, and if so gathers the new store into the existing entry. If no entry exists, a new entry is written into the queue, and if the number of free entries falls under a threshold, the oldest entries are written back to L2 Cache 268 and L3 272 caches.

When a new outermost transaction begins, all existing entries in the store cache are marked closed so that no new stores can be gathered into them, and eviction of those entries to L2 Cache 268 and L3 272 is started. From that point on, the transactional stores coming out of STQ 260, of LSU 280, allocate new entries, or gather into existing transactional entries. The write-back of those stores into L2 Cache 268 and L3 272 is blocked, until the transaction ends successfully; at that point subsequent (post-transaction) stores can continue to gather into existing entries, until the next transaction closes those entries again.

Store cache 264 is queried on every exclusive or demote XI, and causes an XI reject if the XI compares to any active entry. If the core is not completing further instructions while continuously rejecting XIs, the transaction is aborted at a certain threshold to avoid hangs.

LSU 280 requests a transaction abort when store cache 264 overflows. LSU 280 detects this condition when it tries to send a new store that cannot merge into an existing entry, and the entire store cache 264 is filled with stores from the current transaction. Store cache 264 is managed as a subset of the L2 Cache 268: while transactionally dirty lines can be evicted from the L1 Cache 240, they have to stay resident in the L2 Cache 268 throughout the transaction. The maximum store footprint is thus limited to the store cache size of 64×128 bytes, and it is also limited by the associativity of the L2 Cache 268. Since the L2 Cache 268 is 8-way associative and has 512 rows, it is typically large enough to not cause transaction aborts.

If a transaction aborts, store cache 264 is notified and all entries holding transactional data are invalidated. Store cache 264 also has a mark per doubleword (8 bytes) whether the entry was written by a NTSTG instruction—those doublewords stay valid across transaction aborts.

Millicode-Implemented Functions

Traditionally, IBM mainframe server processors contain a layer of firmware called millicode which performs complex functions like certain CISC instruction executions, interruption handling, system synchronization, and RAS. Millicode includes machine dependent instructions as well as instructions of the instruction set architecture (ISA) that are fetched and executed from memory similarly to instructions of application programs and the operating system (OS). Firmware resides in a restricted area of main memory that customer programs cannot access. When hardware detects a situation that needs to invoke millicode, the instruction fetching unit 204 switches into "millicode mode" and starts fetching at the appropriate location in the millicode memory area. Millicode may be fetched and executed in the same way as instructions of the instruction set architecture (ISA), and may include ISA instructions.

For transactional memory, millicode is involved in various complex situations. Every transaction abort invokes a dedicated millicode sub-routine to perform the necessary abort steps. The transaction-abort millicode starts by reading special-purpose registers (SPRs) holding the hardware internal abort reason, potential exception reasons, and the aborted instruction address, which millicode then uses to store a TDB if one is specified. The TBEGIN instruction text is loaded from an SPR to obtain the GR-save-mask, which is needed for millicode to know which GRs 228 to restore.

The CPU (e.g., CPUs 114 *a, b* of FIG. 1) supports a special millicode-only instruction to read out the TX backup-GRs 224 and copy them into the main GRs 228. The TBEGIN instruction address is also loaded from an SPR to set the new instruction address in the PSW to continue execution after the TBEGIN once the millicode abort sub-routine finishes. That PSW may later be saved as program-old PSW in case the abort is caused by a non-filtered program interruption.

The TABORT instruction may be millicode implemented; when the IDU 208 decodes TABORT, it instructs the instruction fetch unit to branch into TABORT's millicode, from which millicode branches into the common abort sub-routine.

The Extract Transaction Nesting Depth (ETND) instruction may also be millicoded, since it is not performance critical; millicode loads the current nesting depth out of a special hardware register and places it into GRs 228. The PPA instruction is millicoded; it performs the optimal delay based on the current abort count provided by software as an operand to PPA, and also based on other hardware internal state.

For constrained transactions, millicode may keep track of the number of aborts. The counter is reset to 0 on successful TEND completion, or if an interruption into the OS occurs (since it is not known if or when the OS will return to the program). Depending on the current abort count, millicode can invoke certain mechanisms to improve the chance of success for the subsequent transaction retry. The mechanisms involve, for example, successively increasing random delays between retries, and reducing the amount of speculative execution to avoid encountering aborts caused by speculative accesses to data that the transaction is not actually using. As a last resort, millicode can broadcast to other CPUs (e.g., CPUs 114 *a, b* of FIG. 1) to stop all conflicting work, retry the local transaction, before releasing the other CPUs 114 to continue normal processing. Multiple CPUs (e.g., CPUs 114 *a, b* of FIG. 1) must be coordinated to not cause deadlocks, so some serialization between millicode instances on different CPUs (see FIG. 1, CPUs 114 *a, b*) is required.

A nested transaction is a transaction that is performed within another transaction. The transaction in which a nested transaction is nested is referred to as its "outer" transaction. When a nested transaction fails, all changes made within the nested transaction are rolled back. However, the failure of the nested transaction does not necessarily cause its outer transaction to fail. Whether the outer transaction fails in response to the failure of a nested transaction is determined by the logic of the outer transaction.

Transactions may be nested, and can be classified as open or closed nested. If a thread is currently executing a transaction and reaches the start of a new transaction, this atomic block is executed as a closed nested child transaction of the currently-executing parent. This nested transaction executes within the same isolation boundary as the enclosing transaction, and just like other memory accesses of the enclosing transaction, the effects of the nested transaction will only become visible when the enclosing transaction commits. In other words, the parent transaction is effectively suspended, and the closed nested transaction is allowed to run to completion before processing in the parent is resumed. When a nested transaction rolls back, its temporary effects are undone and the state of the parent transaction is restored to the point that the nested child transaction began. Two known techniques for combining a child transaction with a parent transaction are collapsed nesting and closed nesting.

Collapsed nesting is a technique for combining transaction nesting. Collapsed nesting involves subsuming all nested transactions into their top-level ancestor. In an example scheme known in the art, the nested begin/end transaction instructions are not processed except to update a nest depth counter; only when this counter is 0 after an end transaction does a transaction commit.

An alternative to a technique of collapsed nesting is closed nesting, in which only aborted transactions and their descendants, not their entire ancestry, are prone to being rolled back. Closed nesting offers a potential performance advantage in, for example, the case of a long transaction seeking to acquire a highly contended resource. In a closed nesting policy, enclosing the lock acquisition in a nested transaction of its own limits the cost of conflicting on the contended lock to only a few rolled-back instructions. Other performance justifications for supporting closed nesting may be advanced; however, it must be noted that after a nested transaction commits, the entire read and write set of the nested transaction(s) are merged into its parent transaction, exposing the parent to potential conflict.

The merging of a parent transaction with a child transaction typically carries a number of inherent risks. For example, as child transactions are merged with the parent transaction, the footprint of the parent becomes larger. In other words, the amount of resources needed to process the parent becomes larger as child transactions are merged with the parent. This can lead to several complications. First, there are often system limitations that constrain the maximum allowable size of a given transaction yielding a size limit for merged transactions. Second, competition for a popular resource can be fierce, leading to delays in transaction processing if the merged transaction requires that resource. Third, as the merged transaction grows in size the transaction typically requires more time to be processed. As such, there is an increased chance that a value being used by the transaction may be read or written to by another transaction, leading to an abort of the merged transaction. Fourth, if an conflict arises with a child transaction of a merged transaction, then the parent may itself may experience a resulting conflict leading to an abort of the merged transaction.

These complications are likely to become even more pronounced if two outmost transactions are combined to form a single transaction. A consequence of combining two outmost transactions is the generation of a much larger footprint (e.g., a cache memory footprint) for the transaction, which leads to an increased risk of the transaction being aborted. For at least this reason, in the known art, two outmost transactions are not combined to form a single transaction. Such a combination within the known art could result in numerous conflicts that would render many known transaction processing techniques inoperable or very inefficient. However, in the following discussion, a technique of combining two or more outmost transactions to increase performance, a process herein denoted as "coalescing", will be discussed.

Hardware support for transactional memory in computing systems attempts to guarantee that the contents of a hardware transaction are executed atomically. That is, a hardware transaction takes effect in its entirety or not at all. The hardware keeps track of the fetch and store footprint, i.e., a memory footprint, encountered within a transaction with a cache line granularity. A memory footprint includes the addresses in memory that are read from or written to during the processing of a transaction. Fetches and stores made to memory addresses cached in these lines in a transaction appear to be performed atomically. In addition, the hardware saves the contents of the general registers (e.g., the number of general registers, and which register can be saved, can be defined in the TBEGIN instruction), instruction address of a transaction begin instruction, program status word value (PSW), and other architected and micro-architected registers before the start of the transaction. In case of an abort, hardware restores back the values.

To limit the number of cache lines to observe as subset of the cache footprint, and to reduce the number of backup registers to be restored in case of an abort, hardware can limit the number of "active" outer transaction in the pipeline. In some instances, this is because, among other things, each outer transaction has its own backup register values, in case it gets aborted, and its own cache footprint. In some systems the hardware limits the number of outmost transactions from dispatch to completion to only one. Such a restrictive pipeline can limit the rate at which transactions are processed and lead to a bottleneck of transactions to be processed. In such a case, the hardware stalls the pipeline at the decode or dispatch areas once a new transaction is decoded, while there is still another transaction that is not yet competed. The stalling of the new outer transaction in decode or dispatch stage (in implementation, the outer transaction begin instruction and all following (i.e., younger) instructions are often held) can reduce the need for additional backup registers and additional monitors of its cache footprint.

In certain circumstances, outmost transactions are of close proximity. As a result of the close proximity, pipeline stalls or pipeline bubbles are incurred, causing significant performance degradation. An outermost traction can be of a single depth or can instead include nested transactions. By coalescing two or more outermost transactions into a single transaction, pipeline stalls or pipeline bubbles can be reduced.

Turning now to FIGS. 4-8, each outermost transactions has its own cache footprint and a transaction dependent value of general register contents that need to be restored if the transaction is aborted. A cache footprint is a map of all cache lines touched by memory operand accesses of the transaction. If, however, two or more outermost transactions are coalesced into a single transaction, then the footprints of the transactions are merged into a single footprint (a coalesced footprint). However, the backup registers are still configured for the original, i.e., non-coalesced, transactions. Therefore, in the case of an abort, the hardware rolls back to the start of the oldest transaction of the coalesced set and does not store any transaction store data of the coalesced transactions to memory. If the coalesced set of transactions complete, all store data of the coalesced transacts are stored to memory in a single atomic operation, as observed by other processors.

In one embodiment, the processor monitors the end of a transaction (i.e., the outermost transaction end instruction)

and determines if that transaction should be coalesced into another transaction when a new transaction start (transaction begin instruction) is identified. When two outermost transactions are coalesced, the non-transactional instructions between them, if any exist, that would previously have been executed non-transactionally, may be executed transactionally instead. There are a number of possible factors that can be used to make such a determination. Many such factors can be categorized for example as threshold limits or history of successful transaction processing post coalescence or instruction specific characteristics. For example, one factor can be the number of instructions between the outermost transaction end instruction of the first transaction and the outermost transaction begin instruction of another. This factor can be expressed as a threshold limit. If there are too many instructions between the outermost transaction end instruction of the first transaction and the outermost TBEGIN of another then those transactions will not be coalesced.

In a second example, a factor can be projected instructions per cycle (IPC). Even if the number of instructions between two transactions is low, the instructions may be micro-encoded or have long latency operations that require a large number of execution cycles to complete. Therefore, the projected IPC can be a helpful factor when determining whether or not to coalesce a given transaction with another. If the projected IPC exceeds a threshold then the transactions will not be coalesced.

A third factor can be the class to which the instructions between two transactions belong. If such instructions do not belong to a certain class, then coalescing those two transactions could lead to an abort. Therefore, the class of instructions located between two transactions can be a useful factor to take into account when determining whether or not to coalesce two outmost transactions. If the instructions do not belong to the required class then the transactions will not be coalesced.

A fourth factor can be the history of prior occurrences of the identified transactions. A history that indicates the transactions have been coalesced without an abort can be a good indicator that the transactions can be coalesced again and processed together as a single transaction.

A fifth factor can be a threshold limit on the number of transactions that can be coalesced. For example, due to the increased risk of abort as the number of coalesced transactions increases, a threshold limit of five is employed. Therefore, if five transactions have already been coalesced then a sixth transaction will not be added.

A sixth factor can be the limitations of resources that are available. This can be compared to the historical size of a given transaction, such as the size of instructions, footprint size, stores buffer usage, distinct cache lines etc. In general as a transaction increases in size there is an increase in the footprint size of the transaction. This footprint includes the resources required to execute the transaction. This can become a limiting factor when transactions are being coalesced. As such, the size of a footprint of a coalesced transaction is used to determine if additional coalescing is possible. For example, three transactions have been coalesced and there are excess resources still available. A fourth transaction is identified and the resources required to process the transaction are analyzed. A comparison between the amounts of available resources to the resources required to process the transaction can yield a determination as to whether the fourth transaction should be coalesced. The resources required by the coalesced transaction should not exceed the available resources since this will lead to an abort. One example of such a resource is a number of cache lines needed by the coalesced transactions. Another example of such a resource is a number of cache lines of a congruence class needed by the coalesced transaction (an 8 way set+associative cache can not support a transaction needing more than 8 cache lines in a set). Multi-treaded processors may have further resource limitations to permit concurrent execution of transactions on multiple threads.

A seventh, factor can be the number of times a given transaction has been previously aborted. If the number of logged aborts for that transaction exceeds a threshold, then it could be wasteful to coalesce that transaction with another. As such, if the number of logged aborts for that transaction exceeds the threshold, then the transactions will not be coalesced. A transaction may be identified by, for example, the address of the transaction begin instruction that starts the transaction, or an identifier value associated with each transaction.

In many embodiments, there is a limit as to the number of transactions that can be coalesced. This number can be hardwired, programmed or can be dynamically chosen by hardware. In some embodiments, if there is an abort of a transaction, then the coalescing function determines if the aborted transaction was a coalesced transaction. If the aborted transaction was a coalesced transaction, then the limit as to the number of transactions that can be coalesced may be temporarily set to one and the transactions retried individually, i.e., not coalesced. If the aborted transaction was not a coalesced transaction, then that transaction is handled as a normal abort. In some embodiments, the limit as to the number of transactions that can be coalesced may be reduced by one each time a given coalesced transaction is aborted. For example, if five transactions are coalesced and that coalesced transaction leads to an abort then the limit as to the number of transactions that can be coalesced would be reduced to four. A new coalesced transaction would then be created and be processed using the new lower limit. However, in certain situations certain transactions may not be coalesced according to a machine dependent protocol for coalescing. For example, if there is a transaction T, and the instructions of a prior transaction T−1 are beyond a certain pipeline stage, e.g., are about to complete, then transaction T may not be coalesced with transaction T−1.

In some embodiments, a checkpoint is defined at the boundary of each outermost transaction. A checkpoint boundary is used to identify which part of a transaction footprint, of a coalesced transaction, corresponds to each respective transaction that was coalesced. In the case of an abort, these checkpoints can be used as return points. For example, if T1, T2, T3 and T4 are non-nested transactions which are coalesced and there is an abort due to T4, then the footprint can be analyzed and the section of the footprint corresponding to transaction T4 can be isolated and the rest of the footprint corresponding to T1, T2 and T3 can be committed. Thus, only the transaction T4 would require re-execution as an outermost transaction and not the entire coalesced transaction. However, this is not the case if T1-T4 is nested transactions. If T1-T4 include nested transactions, then T1-T3 cannot be committed.

To handle an abort using such a checkpoint, the transaction can be isolated to a certain checkpoint boundary. For example, if there is a memory cross interrogate that affects transaction T when M transactions are coalesced and T is less than or equal to M, then commit transactions 1 to T−1 and restore back to start again at transaction T. One method to mark checkpoint boundaries is through the instruction address of an outermost transaction begin instruction(s). In general as transaction size increases there is a corresponding increase in the time it takes to complete the transaction, which increases chances of an abort occurring since other processors/threads have more time to generate conflicts. However, through the use of checkpoint boundaries, the potential decreased performance due to increased transaction size can be mitigated since only the transactions directly affected by the conflict will need to be re-executed.

In one embodiment, non-transactional instructions that exist between two transactions require consideration. In certain embodiments, instructions that are not part of any transaction can be marked as transactional instructions when transactions that are architecturally older and younger are than those instructions are coalesced. This can be of use when an abort condition leads to a return to the first transaction of the coalesced set of transactions. Certain instructions may be restricted from being included as part of a transaction. Instructions that are not part of, or can not be a part of, any transaction may be marked as not being part of any transaction. For example, in the case where checkpoint boundaries have been applied, there is a load instruction that has been marked as being part of a transaction and another load instruction that is marked as non-transactional. If an abort occurs then the non-transactional load value can be saved and tracked. This means that less work needs to be done in the future since the loaded value still exists. However, the transactional load instruction will have to be repeated. In another example, a store instruction is transactional. The address of the stored value is added to the footprint of the transaction and that stored value is observed for conflict.

In some embodiments, a dynamic predictor is employed to aid in the determination of whether transactions should be coalesced. There are two starting states, i.e., initial states for transaction history, which can be used for such a predictor. In both cases, changes are made to transaction history as transactions are completed.

The first starting state is a historical state where it is assumed that all transactions can not be coalesced. When prompted, coalescing activity commences and the history is updated to reflect whether coalesced transactions were successfully executed, i.e., were committed, or were aborted. The updated history can then be used to guide future coalescing activity. The history can include a transaction identifier (e.g., a transaction begin address) the footprint size of a transaction, size of instructions of the transaction, and other data that can be used to determine whether a given transaction can be coalesced.

The second starting state is a state where it is assumed that all transactions can be coalesced. As above, coalescing activity commences and the history is updated to reflect whether coalesced transactions were successfully executed or were aborted. In such a situation, transactions are coalesced whenever possible and this information is saved as part of a history. The history would therefore indicate that a given transaction has been coalesced based on transaction identifier of coalesced transactions, for example, information such as transaction begin instruction address.

In certain embodiments, a flag, a hardware protected bit, is set for transactions as an indication to help direct coalescing activity. A first flag can be used to indicate that a given transaction has been successfully coalesced with architecturally younger (i.e., following) transaction, and a second flag can be used to indicate that the given transaction has been successfully coalesced with an architecturally older one. The use of flagging can be extended to provide further coalescing capability and increased completion of coalesced transactions, i.e., a decreased number of aborted coalesced transactions. If a coalesced transaction is aborted, then the abort reason can be examined. If it is determined that the reason for the abort is due to the coalescing of two or more transactions, then the younger transaction is flagged to indicate that the younger transaction cannot be coalesced with architecturally older (i.e., preceding) transactions. Further, the older transaction can be flagged to indicate that the older transaction cannot be coalesced with architecturally younger transactions. In some embodiments a rating system is applied to indicate how likely a given transaction can be successfully coalesced with another transaction without a resulting abort. For example a transaction can have a weak, medium or strong coalescing flag to indicate the potential of a given transaction being successfully coalesced. Preferably, flags are updated each time a given transaction is processed.

Such flagging of transactions can be useful to differentiate between individual transactions and to help direct future coalescing activity. For example, when T1, T2, T3 and T4 transactions are coalesced together and a resulting abort is due to the fact that T1 and T4 are coalesced, then only T4 is flagged to indicate that it cannot be coalesced with architecturally older transaction. Alternatively, T1 can be flagged to indicate that T1 cannot be coalesced with architecturally younger transactions, or T1 can be flagged to indicate that T1 cannot be coalesced with an architecturally younger transaction if that younger transaction is already coalesced with one or more other transactions. Then, in future coalescing activity, the flags of T1 and T4 can be used to determine whether or not those transactions should be coalesced with other transactions. Finally, if a coalesced transaction completes successfully, a flag is set to indicate that this transaction can be coalesced with younger and older transactions. Example functionality of a dynamic hardware predictor that uses transaction history and flags to direct future coalescing activity is described in detail in the discussion of FIG. 6. In this embodiment, the prediction of coalescing success is handled purely in hardware. In other embodiments, this function may be handled purely in software or in a combination of hardware and software.

In some embodiments, there may be indicators which can be used to control transaction coalescing activity. To that end, a control indicator program for adding general indicators that control transaction coalescing activity is described in detail in the discussion of FIG. 7. Such general indicators are added such that, where possible, the hardware is directed to coalesce transactions. Such general indicators may be added without knowledge of hardware constraints, such as current resource availability. In one embodiment, the addition of general indicators for coalescing is handled in a purely software embodiment. In other embodiments, this function may be handled purely in hardware or in a combination of hardware and software. To add context to the discussion of FIG. 7, a general description of various indicators is provided in the following paragraph.

A first indicator can be set by execution of a software instruction that indicates to hardware to begin to coalesce transactions where possible from that point forward. A second indicator can be set by execution of a software instruction that indicates to hardware to cease coalescing transactions from that point forward. A third indicator can be set based on a prefix ahead of a transaction begin (transaction begin instruction) to indicate that the transaction following the transaction begin instruction can be coalesced. A fourth indicator can be set based on a prefix ahead of a transaction begin (transaction begin instruction) to indicate that the transaction following the transaction begin instruction can not be coalesced. A fifth indicator can be set by an operand associated with the transaction begin instruction itself, which indicates that the transaction can be coalesced. Yet another indicator can be set by an instruction to set a threshold. For example, the maximum number of transactions that can be coalesced or the maximum number of instruction that can be present between two transactions to be coalesced.

In certain circumstances coalescing memory transactions can negatively impact performance since the cache footprint of the combined transactions is larger than each of the individual transactions. In a multi-processor environment running many concurrent workloads, as footprint size increases there is an increased chance that workload data can interfere, thereby leading to a higher percentage of transaction aborts. As such, a performance gain from combining distinct transactions can be decreased, or even lost, due to higher rate of transaction aborts. However, in other circumstances, coalescing transactions yields better performance without any visible increase in transactions being aborted. Hardware by itself may not be able to tell when it would be beneficial to coalesce transactions and when it would not be beneficial. Through the use of dynamic code profiling of the workloads, software can arrange code and insert hint information allowing hardware to make determinations as to whether coalescing distinct memory transactions is beneficial.

In certain embodiments, hardware provides a hardware supported runtime instrumentation environment that can be used in real-time to gain insights of a targeted running program. Information that cannot be obtained from pure software real-time profiling can be obtained through the hardware directly, e.g. information about transaction memory and their characteristics. Dynamic code generating environments like Java® Run-time Environment (JRE) can steer this hardware infrastructure to determine what data to collect and how often to collect that data, and thus be enabled to create "self-tuned" run-time generated code.

In some embodiments, run-time instrumentation profile code can be used to perform many tasks. Run-time instrumentation profile code can be used to give hints to hardware to coalesce transactions or keep them independent. It can be used to change code to automatically merge distinct transactions by removing a transaction end instruction of a first transaction and transaction begin instruction of a second transaction and change instructions between those two transactions to non-transactional instructions. Run-time instrumentation profile code can be used to add prefix instructions, i.e., an indicator, ahead of, for example, a transaction begin instruction of a transaction indicating that the transaction needs to be treated independently and cannot be coalesced. It can also be used to change the transaction begin instruction or transaction end instruction themselves such that the transactions cannot be coalesced.

In some embodiments a profiler program gathers data such as reasons for a transaction being aborted, distance in the instructions between the coalesced transactions, the type of instructions between transactions, whether any of the instructions are restricted from running in a transaction, the number of dynamic instructions in each transaction, and the size of dynamic instructions footprint, e.g., the size of the store cache buffer needed, the number of cache line used, etc. This information can then be used to optimize the coalescing of transactions through the use of dynamic code profiling of the workloads. Software can arrange code and insert hint information allowing hardware to make determinations as to whether coalescing distinct memory transactions are beneficial. A coalescing optimizer 700 that optimizes the coalescing of outermost transactions to maximize performance gains is described in detail in the discussion of FIG. 8.

Referring now to FIGS. 1-20.

The present disclosure may be a system, a method, and/or a computer program product. The computer program product may include a computer readable storage medium (or media) having computer readable program instructions thereon for causing a processor to carry out aspects of the present disclosure.

The computer readable storage medium is a tangible device that can retain or store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium would include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives a program from the network and forwards the program for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In a first embodiment, aspects of coalescing control 300, transaction coalescing operations 400, dynamic prediction 500, control indicator 600 and coalescing optimizer 700 are included in certain hardware of FIG. 2 or are stored in a computer-readable storage medium (not shown) included as part of CPU environment 112 of FIG. 2 according to an embodiment. In this embodiment, hardware-based aspects of coalescing control 300, coalescing operations 400, dynamic prediction 500, control indicator 600 and coalescing optimizer 700 are included as part of the physical structures of die 100 of FIG. 1 and CPU environment 112 of FIGS. 2 and 3.

In certain embodiments, the functions and processes of coalescing control 300, transaction coalescing operations 400, dynamic prediction 500, control indicator 600 and coalescing optimizer 700 can be combined in whole, or in part, to form various programs or corresponding hardware structures that are within the spirit and scope of the embodiments described in the discussion of FIGS. 4-8 below and in the discussion above for hardware-based transaction execution. As such, embodiments of the disclosure may include a variety of methods, computer program products, and hardware structures as described in the discussion of FIGS. 4-8 and in the discussion above. In addition, certain features and functions may be performed by the hardware structures described in the discussion of FIG. 11.

Figure 4:
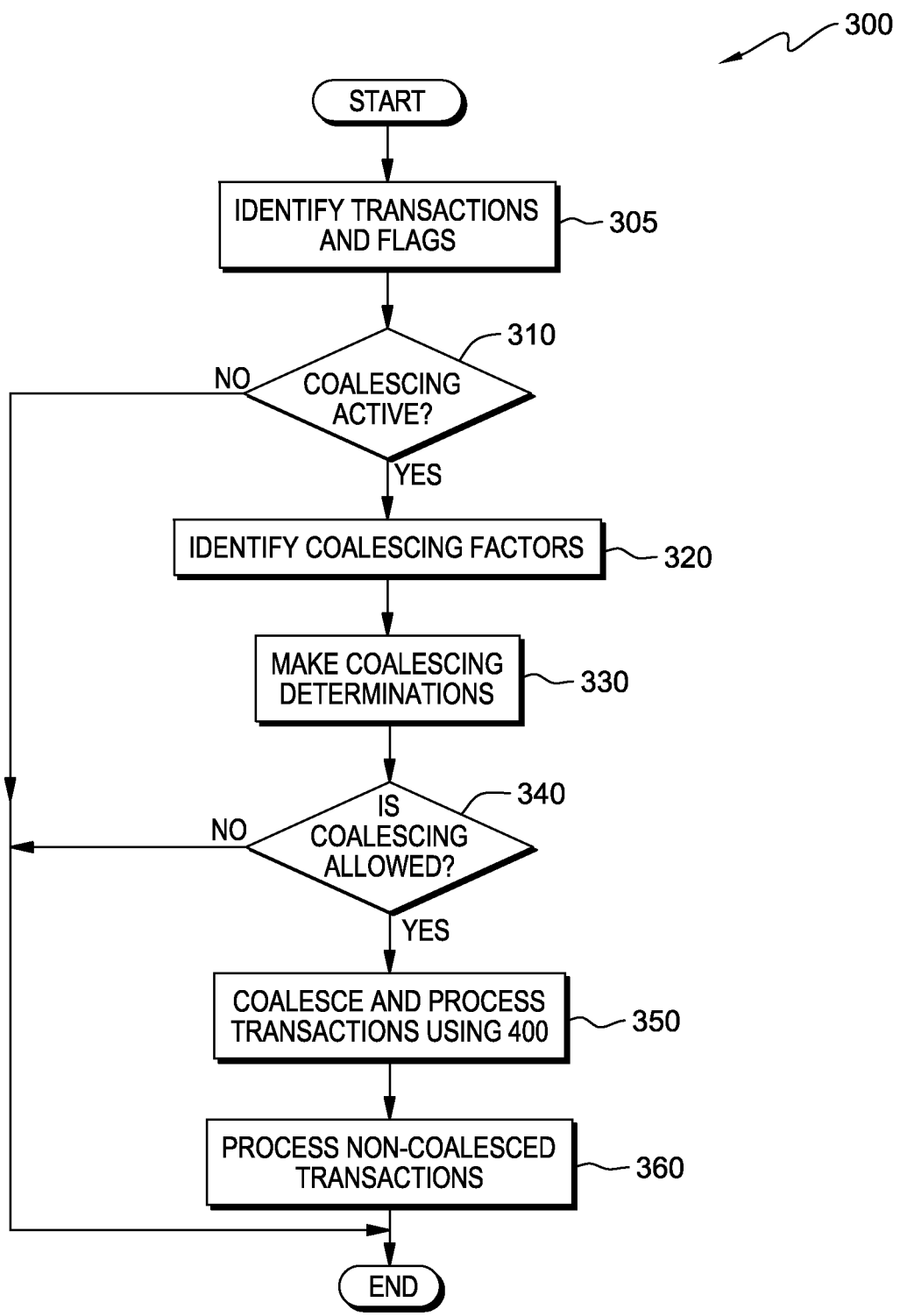
FIG. 4 illustrates the operational activity executed by a coalescing control that controls the coalescing of one outmost transaction with another, in accordance with an embodiment of the present disclosure.

Turning now to FIG. 4. FIG. 4 illustrates the operational activity executed by a first embodiment of coalescing control, 300, that controls the coalescing of one outmost transaction with another. In a first embodiment, the control of coalescing activity is handled by software; however the actual coalescing itself is handled by hardware. In other embodiments, the control of coalescing activity may be handled purely in hardware or in a combination of hardware and software. In still other embodiments, the actual coalescing itself may be handled purely in hardware or in a combination of hardware and software.

In operation 305, coalescing control 300 identifies transactions and the various flags associated with the transactions. In decision operation 310, coalescing control 300 determines if coalescing is active. Coalescing control 300 determines if coalescing is active by identifying indicators in the code that instruct for the activation of the coalescing process. For example, coalescing control program can determine whether coalescing is active by identifying state information set by a set-transaction-coalesce-mode (STCM) instruction or a reset-transaction-coalesce-mode (RTCM) instruction (see the discussion of mode setter 1135 for further details regarding STCM and RTCM). In other embodiments, indicators may not be present. In such cases, the hardware assumes that each outmost transaction has the potential to be coalesced. In this embodiment, these coalescing indicators are added by control indicator 600 and coalescing optimizer 700. If such indicators are not present, then coalescing control 300 determines that coalescing is not active and proceeds to operation 360 (decision operation 310, no branch). If such indicators are present, then coalescing control 300 determines that coalescing is active and proceeds to operation 320 (decision operation 310, yes branch).

In operation 320, coalescing control 300 identifies the coalescing factors that are to be used when determining when two outmost transactions are to be coalesced. This includes threshold limits such as the number of transactions that can be coalesced, the maximum allowable projected instructions per cycle (IPC), and the number of times a given transaction can be previously aborted, or any of the seven factors listed previously. The coalescing factors also include the class to which the instructions between two transactions belong and the resources that are available for transaction processing. The identified coalescing factors are then used by coalescing control 300, in operation 330, to determine if the two outermost transactions, if coalesced, violate any threshold values or exceed the resources that are available for transaction processing. For example, if there is a limit of three transactions that can be coalesced into a single transaction and there are already three transactions present in the coalesced transactions, then coalescing control 300 determines that a fourth transaction can not be coalesced.

In decision operation 340, coalescing control 300 determines if, based on the determinations of operation 330, the two outmost transactions can be coalesced. If the two outmost transactions can not be coalesced (decision operation 340, no branch), then coalescing control 300 proceeds to operation 360. If the two outmost transactions can be coalesced (decision operation 340, yes branch), then coalescing control 300 proceeds to operation 350. In operation 350, coalescing control 300 uses transaction coalescing operations 400 to coalesce the two outermost transactions as well as any instructions between them, if possible. The coalesced transaction is then processed using transaction coalescing operations 400.

In operation 360, coalescing control 300 processes the transactions. The processed transactions may include non-coalesced transactions as well as instructions that were not coalesced.

Figure 5:
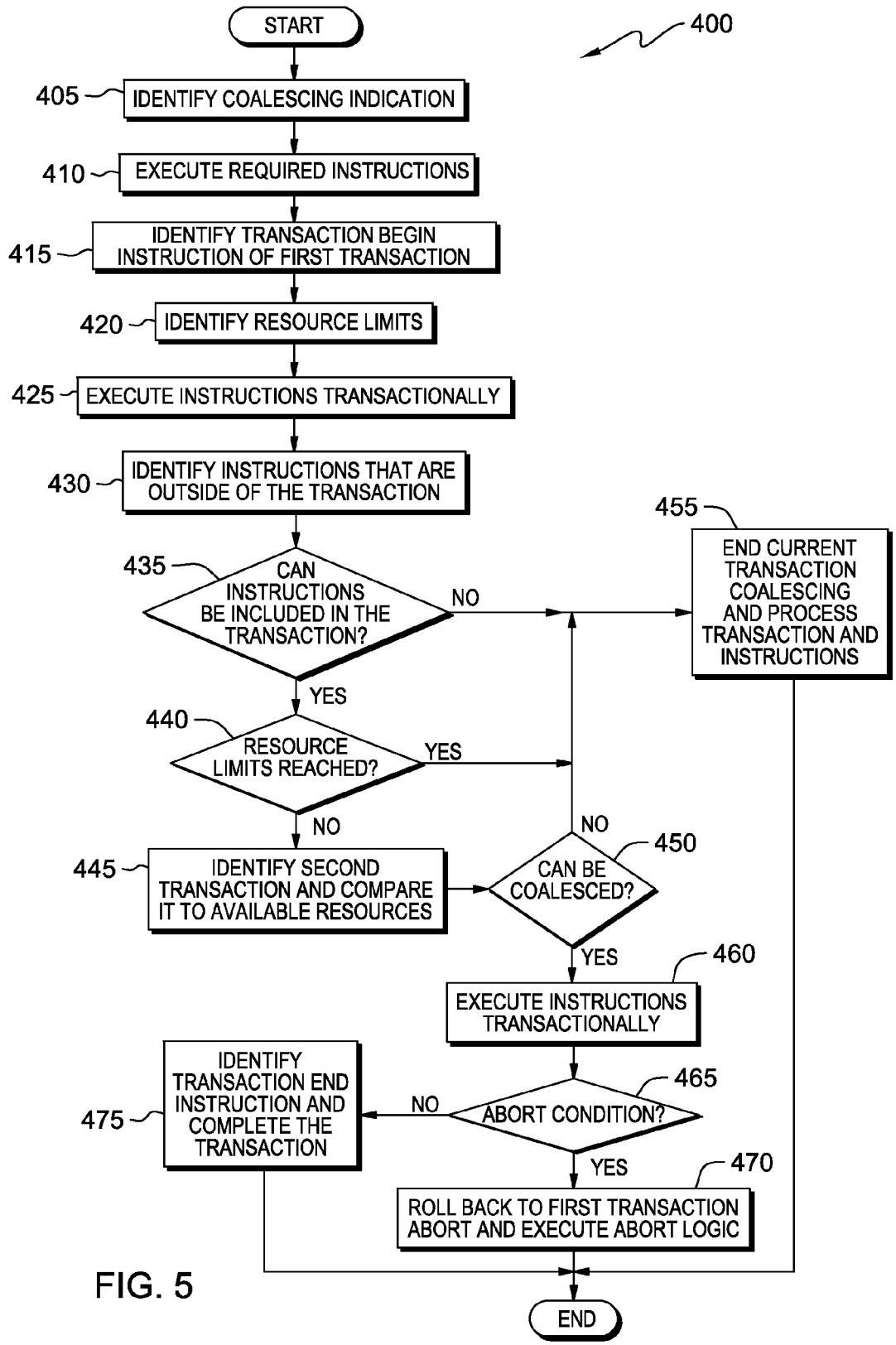
FIG. 5 illustrates operational activity executed for the coalescing of outermost transactions, in accordance with an embodiment of the present disclosure.

FIG. 5 illustrates the operational activity executed by a first embodiment for the coalescing of outermost transactions, herein denoted transaction coalescing operations 400. In the first embodiment described below, the coalescing of transactions is handled purely in hardware, i.e., the operational activity is included as part of and is executed by hardware such as a central processing unit. In other embodiments, the coalescing of transactions may be handled purely in software or in a combination of hardware and software.

In operation 405, of transaction coalescing operations 400, the hardware identifies a coalescing indication, such as a coalescing indicator added by control indicator 600 or coalescing optimizer 700. In other embodiments, if indicators are not being used, the hardware would default to coalescing, i.e., assume that the indicator was present and proceed to operation 410. In operation 410, of transaction coalescing operations 400, any required instructions are executed by the hardware. In operation 415, of transaction coalescing operations 400, the hardware identifies the transaction begin instruction, such as a TBEGIN or an XBEGIN, of an outermost transaction. An outermost transaction begin instruction that is coalesced with prior transactions is still executed in the sense of taking into account the effective controls (in certain architectures, these are part of the instruction text) to apply them to nested instructions. The outermost transaction begin instruction, however, does not increase the nesting depth. The nesting depth is one and remains one. Similarly, an outermost transaction end instruction of a coalesced transaction does not decrement the nesting depth to 0, unless it is the final transaction end instruction.

In operation 420, of transaction coalescing operations 400, the hardware identifies the resource limits of the hardware. Hardware resources can include, for example, store buffer sizes and free resources within them that are not part of a transaction, a number of cache lines that are monitored for existing transactions, and a count of resources of an unused line monitor. In operation 425, of transaction coalescing operations 400 the hardware executes the instructions of the transaction. In operation 430, of transaction coalescing operations 400, the hardware identifies any instructions that are outside of the transaction, e.g., instructions that follow a transaction to be coalesced. Then in decision operation 435, of transaction coalescing operations 400, the hardware determines whether the instructions located outside of the transaction can be included with, i.e., processed with, the instructions of the transaction. In other words, it is determined whether the instructions following the transaction can be included as part of the transaction and be processed accordingly. In general, unless the instruction is flagged otherwise, a given instruction can be included as part of the transaction as long as doing so does not exceed resource limits. If the instructions can not be included (decision operation 435, no branch), then the hardware operations 400 proceeds to operation 455 of transaction coalescing operations 400. If the instructions can be included (decision operation 435, yes branch), then operations 400 the hardware proceeds to decision operation 440 of transaction coalescing operations 400.

In decision step 440, of transaction coalescing operations 400, the hardware determines whether the resource limits have been reached and whether there are sufficient resources available to coalesce a second transaction with the first transaction. For example, if ninety five percent of the available resources are being utilized, then it is determined that, although the resource limits have not been reached, there are insufficient resources available to coalesce a second transaction with the first transaction. Typically, the instructions located outside the first transaction include instructions that are between the first and second transactions. However, in certain cases and embodiments, such outside instructions can include instructions that are not part of a transaction, and can either precede or follow a transaction As such the resources required to process these instructions must also be taken into account. If it is determined that the resource limits have been reached or that there are insufficient resources available to coalesce a second transaction with the first transaction (decision operation 440, yes branch), then the hardware proceeds to operation 455 of transaction coalescing operations 400. If it is determined that the resource limits have not been reached and that there are sufficient resources available to coalesce a second transaction with the first transaction (decision operation 440, no branch), then the hardware proceeds to operation 445 of transaction coalescing operations 400.

In operation 445, of transaction coalescing operations 400, the hardware identifies a second transaction and the resource requirements of that transaction are compared to the amount of available resources. In decision operation 450, of transaction coalescing operations 400, the hardware determines whether the second transaction can be coalesced into the first transaction. This determination takes into account any flags that are attached to the first and second transaction. For example, if the first or second transaction includes a flag that indicates that it can not be coalesced with the other transaction, then it is determined that the transactions can not be coalesced. If the transactions can not be coalesced (decision operation 450, no branch), then the hardware proceeds to operation 455 of transaction coalescing operations 400. In operation 455, of transaction coalescing operations 400, the hardware ends the current transaction coalescing activity and the transaction is processed, along with any instructions that have been included with that transaction.

If it is determined that the transactions can be coalesced (decision operation 450, yes branch), then the hardware proceeds to operation 460 of transaction coalescing operations 400. In operation 460, of transaction coalescing operations 400, the hardware executes transactionally the instructions of the second transaction. For example, in some cases, the hardware does not fully process the transaction end instruction of the first transaction and the transaction begin instruction of the second transaction. However, some effective controls of either the transaction end instruction of the first transaction or the transaction begin instruction of the second transaction can be processed, thereby effectively processing the second transaction as though it were part of the first transaction.

In decision operation 465, of transaction coalescing operations 400, the hardware determines whether an abort condition has occurred as a result of processing the coalesced transaction. If an abort condition has occurred (decision operation 465, yes branch), then the hardware rolls back the coalesced transaction to the first transaction of the coalesced transaction that aborted and abort logic is executed by the hardware, in operation 470. If an abort condition has not occurred (decision operation 465, no branch), then the hardware identifies the transaction end instruction of the second transaction and the coalesced transaction is committed in step 475. In some situations, operations 405 though 460 can be repeated before the execution of operation 465, thereby coalescing more transactions and instructions into the coalesced transaction.

Figure 6:
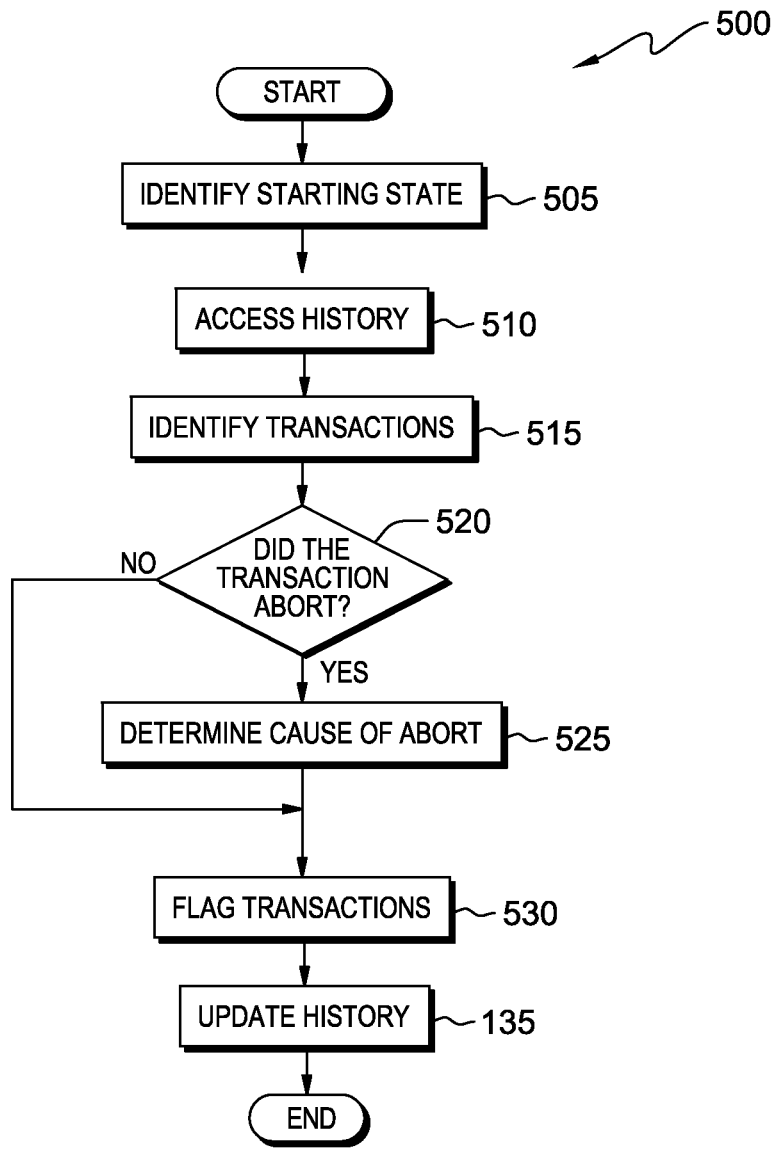
FIG. 6 illustrates the operational activity executed by a dynamic prediction that uses transaction history and flags to direct future coalescing activity, in accordance with an embodiment of the present disclosure.

FIG. 6 illustrates the operational activity executed by a first embodiment of a dynamic prediction, 500, that uses transaction history and flags to direct future coalescing activity.

In operation 505, dynamic prediction 500 identifies the starting state to be applied to the history. As discussed in detail above, the transactional memory system can store a starting state and a history. A starting state is either an assumption that coalescing is allowed for all the transaction or none of them. Then, in operation 510, dynamic prediction 500 accesses the history itself and applies the starting state to the entries. In operation 515, dynamic prediction 500 identifies coalesced transactions that have been processed.

In decision operation 520, dynamic prediction 500 determines if a coalesced transaction experienced an abort. If the coalesced transaction did experience an abort (decision operation 520, yes branch), then dynamic prediction 500 determines the cause of the abort in operation 525. If the coalesced transaction did not experience an abort (decision operation 520, no branch), then dynamic prediction 500 proceeds to operation 530. In operation 530, dynamic prediction 500 applies flags based on either the cause of the abort or the successful execution of the coalesced transaction. For example, there was no abort and the coalesced transaction was committed, as such, dynamic prediction 500 applies flags accordingly. In another example, a pair of transaction that are coalesced do not abort. As such, dynamic prediction 500 applies flags to the transactions that were coalesced to indicate that they were successfully coalesced and processed as a coalesced transaction. In yet another example, a coalesced transaction, which includes four transactions that were coalesced, experiences an abort. Dynamic prediction 500 identifies that the abort was caused by the third and fourth transactions that were coalesced. Dynamic prediction 500 flags the fourth transaction to indicate that it can not be coalesced with older transactions but can be coalesced with younger transactions. Dynamic prediction 500 flags the third transaction to indicate that it can not be coalesced with younger transactions but can be coalesced with older transactions. Finally, dynamic prediction 500 flags the first and second transactions to indicate that they can be coalesced with both older and younger transactions. In some embodiments, dynamic prediction 500 can flag a transaction to indicate that it cannot be coalesced with either younger or older transactions. The flag may even be further qualified with a threshold for the number of transactions that can be coalesced.

In operation 535, dynamic prediction 500 updates the history to indicate that the various transactions had been processed as a coalesced transaction and includes the result of that processing. For example, the history is updated to indicate that a given set of five transactions were successfully coalesced and processed. As such, future instances of those transactions would be identified for coalescing activity.

In some embodiments, dynamic prediction 500 uses the updated history to predict the results of coalescing outermost transactions that have not been previously coalesced. For example, a first and second outermost transaction are coalesced and the resulting coalesced transaction is committed. Dynamic prediction 500 then identifies third and fourth outermost transactions that are similar to the first and second outermost transactions in size, instruction type, footprint etc. Based on the similarity, dynamic prediction 500 determines that the third and fourth outermost transactions will likely commit if coalesced and adds flags and coalescing instructions accordingly. Then based on the results of the coalescing, dynamic prediction 500 updates the history accordingly.

In some embodiments, based on the updated history, dynamic prediction 500 sends a signal to coalescing optimizer 700 to increase or decrease certain thresholds, thereby controlling coalescing activity.

Figure 7:
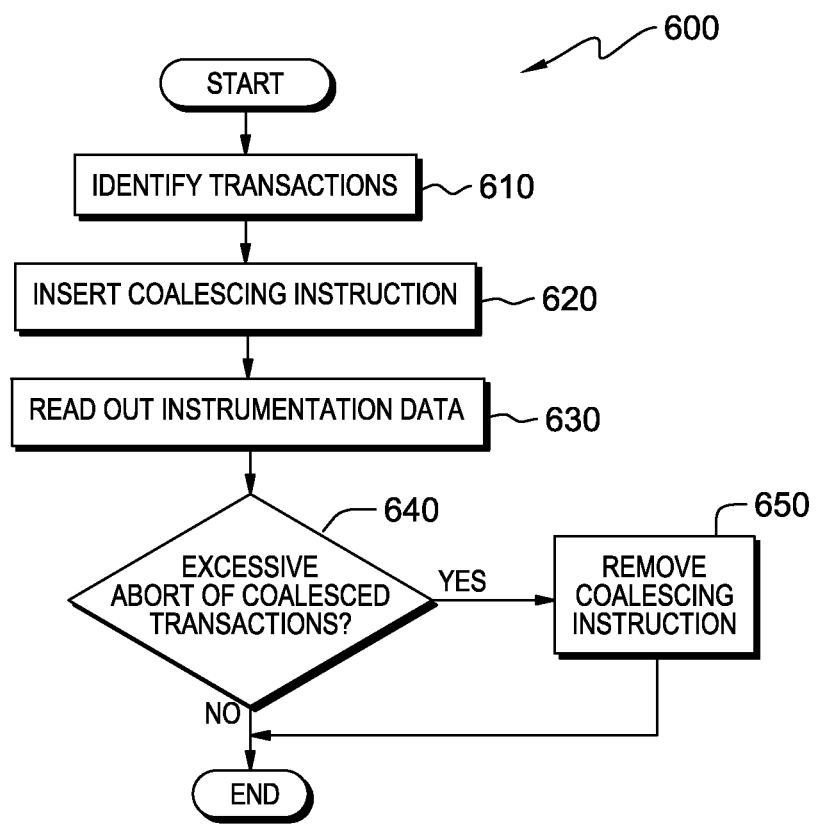
FIG. 7 illustrates the operational activity executed by a control indicator that identifies and handles indicators that control transaction coalescing activity, in accordance with an embodiment of the present disclosure.

FIG. 7 illustrates the operational activity executed by a first embodiment of control indicator, 600, for identifying and handling indicators that control transaction coalescing activity. In some embodiments, control indicator 600 is purely hardware. In some embodiments, control indicator 600 is purely software. In still other embodiments, control indicator 600 includes a combination of both hardware and software. In certain embodiments, control indicator 600 may not insert instructions in the transactions, but may set predictor state instead.

In operation 610, control indicator 600 identifies transactions that are to be processed. In a dynamic software embodiment of control indicator 600, transactions that exhibit excessive stalls, i.e., cause delays in the completion of transactions, are identified. Transactions that exhibit excessive stalls need to be completed before the next transaction can be processed. As such, a coalescing instruction or a machine state may be added such that the transaction that exhibits excessive stalls is not coalesced with a younger transaction. In a static software embodiment of control indicator 600, a set of factors, such as those used in operations 320 and 330 of FIG. 4, can be used to identify transactions that can be coalesced. For example, a threshold number of instructions can be used to identify transactions that are close enough to each other to allow coalescing.

In one embodiment, once the transactions have been identified, control indicator 600 inserts the appropriate coalescing instruction into the code as indicated in operation 620. In some embodiments, control indicator 600 sets state information. Control indicator 600 inserts coalescing instruction (like, for example, a prefix ahead of a transaction begin instruction, or an argument in a transaction begin instruction itself), and then allows the hardware to determine whether to coalesce or not. So, if there are no coalescing instructions, then the hardware does not attempt to coalesce. If there are coalescing instructions, then the hardware determine whether to coalesce or not. In many cases, this results in the hardware attempting to coalesce transactions where possible. The transactions are then processed along with the coalescing instructions. Then, in operation 630, control indicator 600 reads out instrumentation data, e.g., data about instructions being sampled during runtime, from the transaction processing. This includes instrumentation data in either transaction abort code handling or in runtime instrumentation logic.

In decision operation 640, control indicator 600 determines if there have been an excessive number of coalesced transaction aborts. This is usually based on a preset threshold value; however this can also be determined using a dynamic threshold that is adjusted to maximize performance. If there has been an excessive number of aborts (decision operation 640, yes branch), then control indicator 600 removes the coalescing instruction to reduce the number of future aborts, in operation 650. In other embodiments, the coalescing instruction is left in the code by control indicator 600 but the hardware ignores it if there have been an excessive number of coalesced transaction aborts. If there have not been an excessive number of aborts (decision operation 640, no branch), then control indicator 600 leaves the coalescing instruction as is. In some embodiments, if there have not been an excessive number of aborts, then control indicator 600 adds additional coalescing instructions or sends a signal to, for example, coalescing optimizer 700 to increase certain thresholds, thereby increasing coalescing activity or the size of coalesced transactions.

Turning now to both FIGS. 8 and 9, a coalescing optimizer and an associated environment will be discussed. For ease of understanding, the operational processes utilized by a coalescing optimizer, 700, are herein described with reference to components included in FIG. 9. An example of a Java® Run-time Environment (JRE), which is herein denoted JRE 900, that supports the operation of coalescing optimizer 700, is illustrated as a block diagram in FIG. 9.

Figure 8:
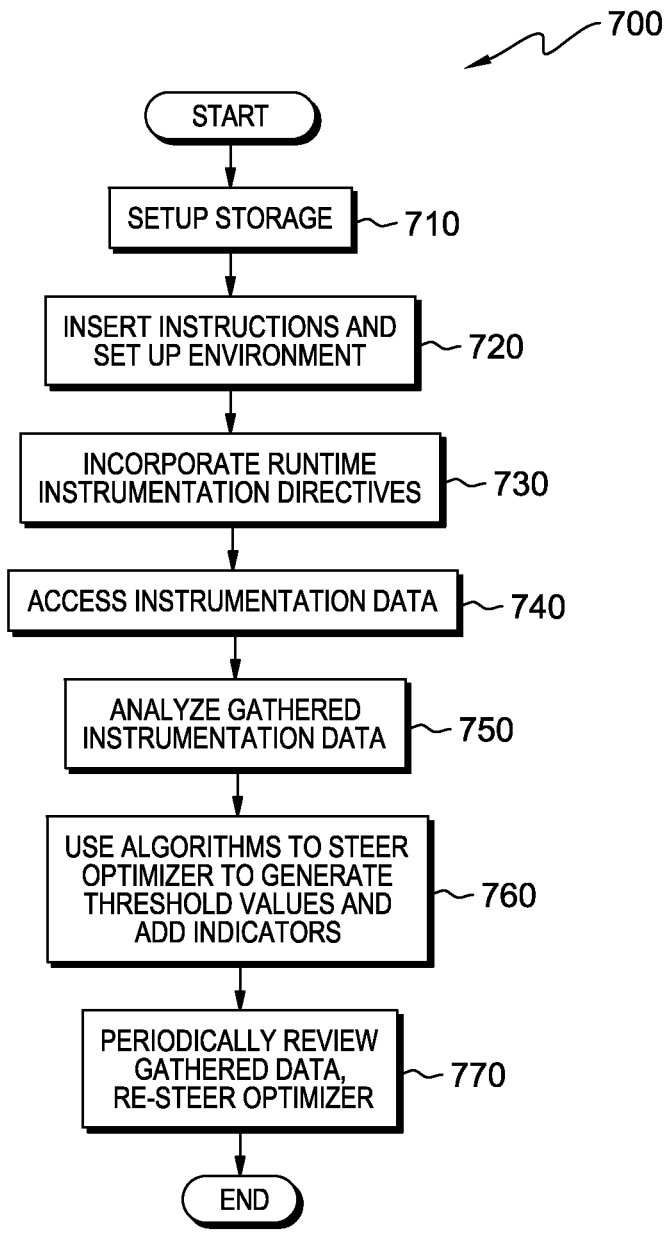
FIG. 8 illustrates the operational activity executed by a coalescing optimizer that optimizes coalescing of outermost transactions to maximize performance gains, in accordance with an embodiment of the present disclosure.
Figure 9:
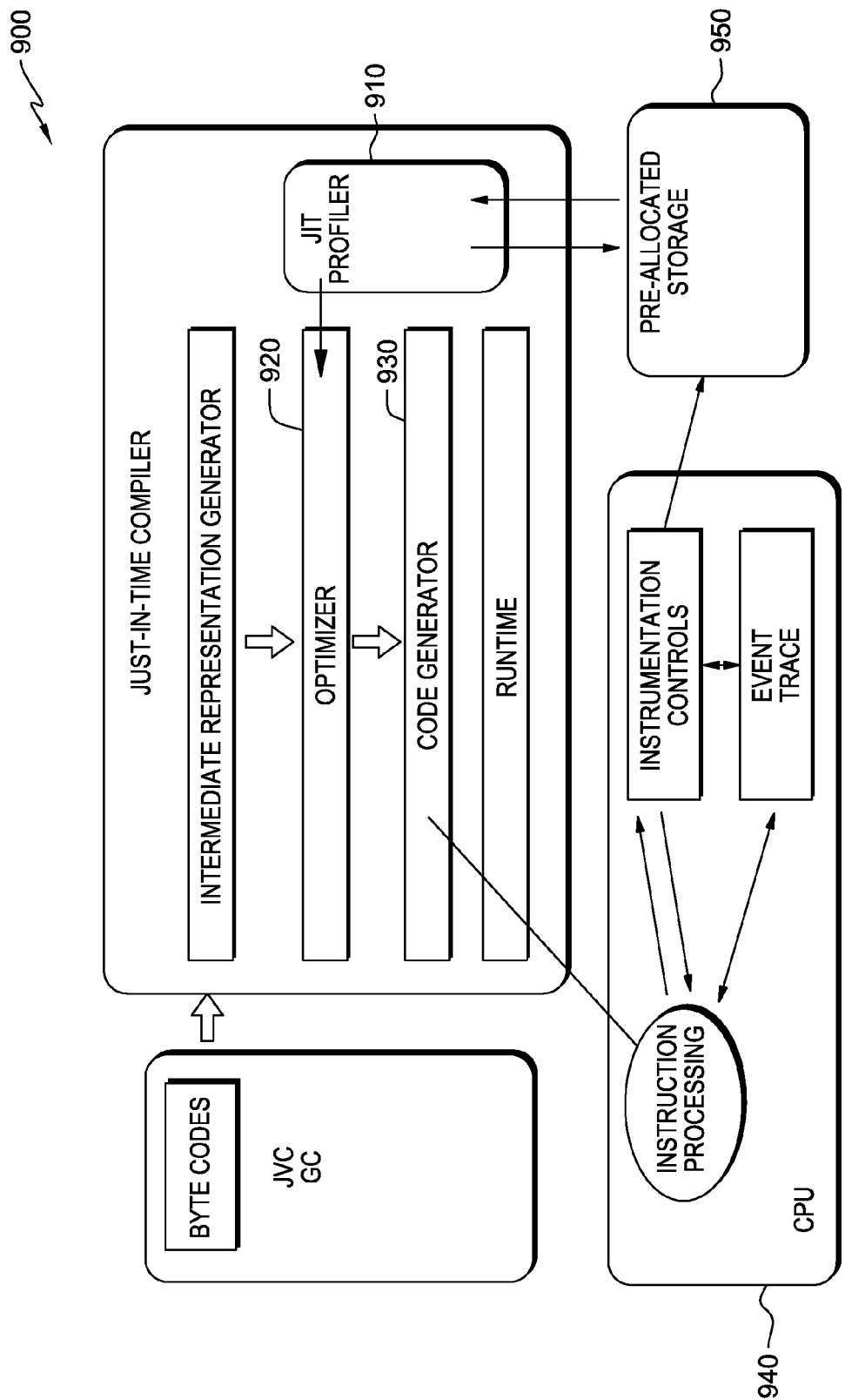
FIG. 9 depicts example components of a Java® Run-time Environment (JRE) that supports the execution of a coalescing optimizer, in accordance with embodiments of the present disclosure.

In accordance with a first embodiment, FIG. 8 illustrates the operational activity executed by a first embodiment of a coalescing optimizer 700 that optimizes coalescing of outermost transactions to maximize performance gains. In the first embodiment, coalescing optimizer 700 is configured to operate within a Java® Run-time Environment (JRE), such as JRE 900. Coalescing optimizer 700 has access to Just-In-Time (JIT) profiler 910, optimizer 920, code generator 930, and is in contact with the hardware, such as CPU 940 and pre-allocated storage 950, of FIG. 9.

In operation 710, using Just-In-Time (JIT) profiler 910, coalescing optimizer 700 sets up a storage area, in pre-allocated storage 950, where the hardware can write runtime gathered instrumentation information. In operation 720, coalescing optimizer 700 uses JIT profiler 910 to insert instructions into the application to turn on or off runtime profiling for various regions of code, and to setup the environment needed in the hardware for such profiling. Coalescing optimizer 700 uses code generator 930 to incorporate the runtime instrumentation directives into its assembly code, which runs in the actual hardware, in operation 730.

In response to receiving the runtime instrumentation directives the hardware sets up its internal instrumentation controls as instructed by these new directives. In operation 740, targeted information is then gathered by CPU 940, e.g. cache miss statistics, and generates instruction samples as setup by JIT profiler 910. The hardware instrumentation controls, through internal firmware and special hardware support, write out of the desired instrumentation data, of instructions being sampled during runtime, to the storage area, in pre-allocated storage 950, which was initially set up by JIT profiler 910.

In step 750, coalescing optimizer 700 uses JIT profiler 910 to analyze the gathered instrumentation data provided by the hardware in real-time. The gathered instrumentation data can include reasons for a transaction being aborted, distance in the instructions between the coalesced transactions, the type of instructions between transactions, whether any of the instructions are restricted from running in a transaction, the number of dynamic instructions in each transaction, and the size of dynamic instructions footprint, e.g. the size of the store cache buffer needed, the number of cache line used, etc. Coalescing optimizer 700 utilizes algorithms to steer optimizer 920 to generate more efficient code, in operation 760.

Coalescing optimizer 700 then uses JIT profiler 910 to periodically review the gathered instrumentation data and any changes in a run-time environment of the assembly code, and re-steer optimizer 920 to adjust the optimization of coalescing instructions according to any new runtime environment changes, in operation 770.

Figure 10:
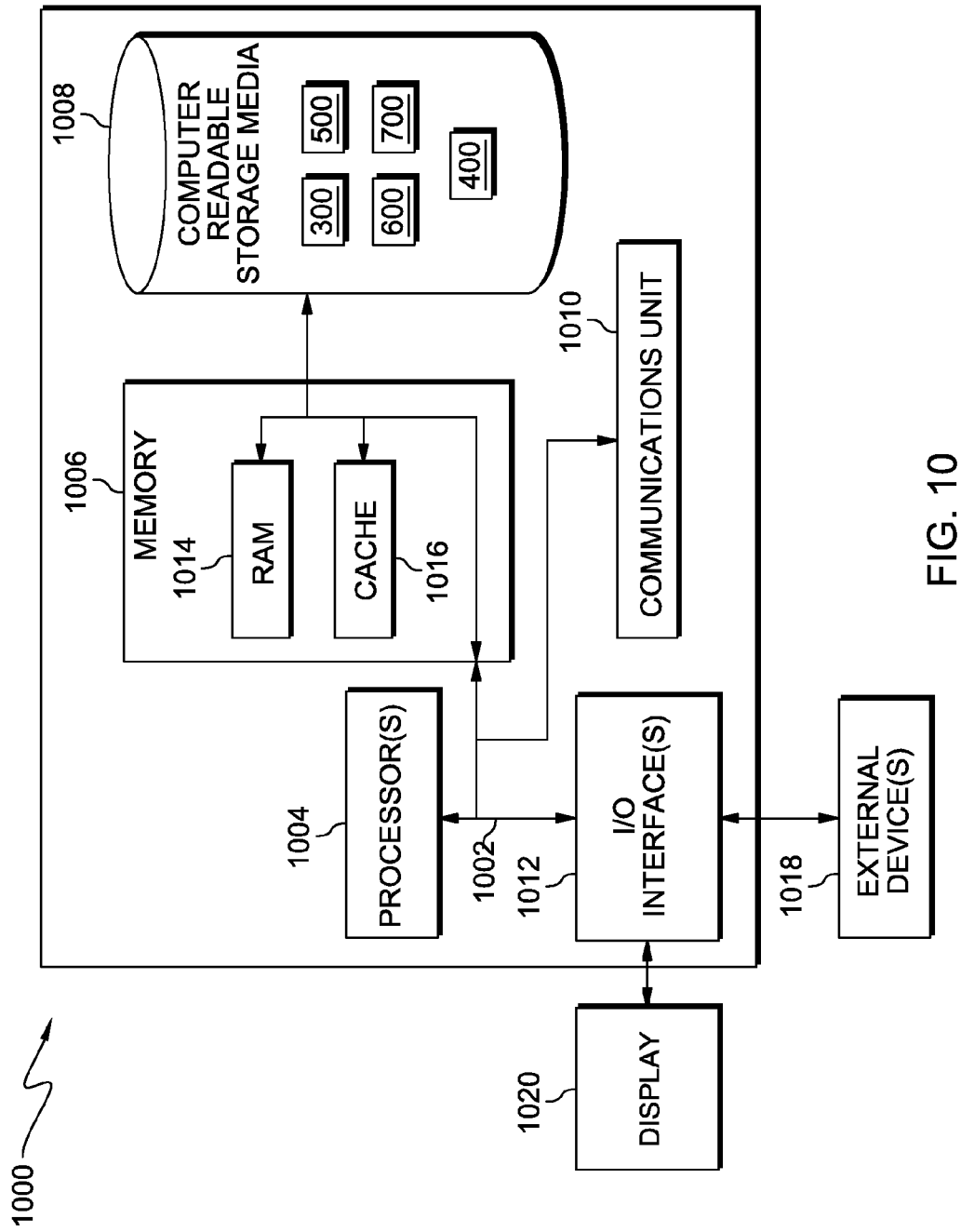
FIG. 10 depicts a block diagram of components of a computing device that is executing a coalescing control, a dynamic prediction, a control indicator and a coalescing optimizer, as well as any software aspects of operational activity executed for the coalescing of outermost transactions, in accordance with embodiments of the present disclosure.

FIG. 10 depicts a block diagram of components of a computing device, 1000, that is executing coalescing control 300, dynamic prediction 500, control indicator 600 and coalescing optimizer 700, as well as any software aspects of transaction coalescing operations 400, in accordance with an illustrative first embodiment of the present disclosure. It should be appreciated that FIG. 10 provides only an illustration of one implementation and does not imply any limitations with regard to the environments in which different embodiments may be implemented. Many modifications to the depicted environment may be made.

Computing device 1000 includes communications fabric 1002, which provides communications between computer processor(s) 1004, memory 1006, computer readable storage media 1008, communications unit 1010, and input/output (I/O) interface(s) 1012. Communications fabric 1002 can be implemented with any architecture designed for passing data and/or control information between processors (such as microprocessors, communications and network processors, etc.), system memory, peripheral devices, and any other hardware components within a system. For example, communications fabric 1002 can be implemented with one or more buses.

Memory 1006 and computer readable storage media 1008 are computer-readable storage media. In the first embodiment, memory 1006 includes random access memory (RAM) 1014 and cache memory 1016. In general, memory 1006 can include any suitable volatile or non-volatile computer-readable storage media.

Coalescing control 300, dynamic prediction 500, control indicator 600 and coalescing optimizer 700, as well as any software aspects of transaction coalescing operations 400 are stored in computer readable storage media 1008 for execution by one or more of the respective computer processors 1004 via one or more memories of memory 1006, in accordance with the first embodiment of the present disclosure. In the first embodiment, computer readable storage media 1008 includes a magnetic hard disk drive. Alternatively, or in addition to a magnetic hard disk drive, computer readable storage media 1008 can include a solid state hard drive, a semiconductor storage device, read-only memory (ROM), erasable programmable read-only memory (EPROM), flash memory, or any other computer-readable storage media that is capable of storing program instructions or digital information.

The media used by computer readable storage media 1008 may also be removable. For example, a removable hard drive may be used for computer readable storage media 1008. Other examples include optical and magnetic disks, thumb drives, and smart cards that are inserted into a drive for transfer onto another computer-readable storage medium that is also part of computer readable storage media 1008.

Communications unit 1010, in these examples, provides for communications with other data processing systems or devices. In these examples, communications unit 1010 includes one or more network interface cards. Communications unit 1010 may provide communications through the use of either or both physical and wireless communications links. Coalescing control 300, dynamic prediction 500, control indicator 600 and coalescing optimizer 700, as well as any software aspects of transaction coalescing operations 400 may be downloaded to computer readable storage media 1008 through communications unit 1010.

I/O interface(s) 1012 allows for input and output of data with other devices that may be connected to computing device 1000. For example, I/O interface 1012 may provide a connection to external devices 1018 such as a keyboard, keypad, a touch screen, and/or some other suitable input device. External devices 1018 can also include portable computer-readable storage media such as, for example, thumb drives, portable optical or magnetic disks, and memory cards. Software and data used to practice embodiments of the present disclosure, e.g., coalescing control 300, dynamic prediction 500, control indicator 600 and coalescing optimizer 700, as well as any software aspects of transaction coalescing operations 400, can be stored on such portable computer-readable storage media and can be loaded onto computer readable storage media 1008 via I/O interface(s) 1012. I/O interface(s) 1012 also connect to a display 1020.

Display 1020 provides a mechanism to display data to a user and may be, for example, a computer monitor.

Figure 11:
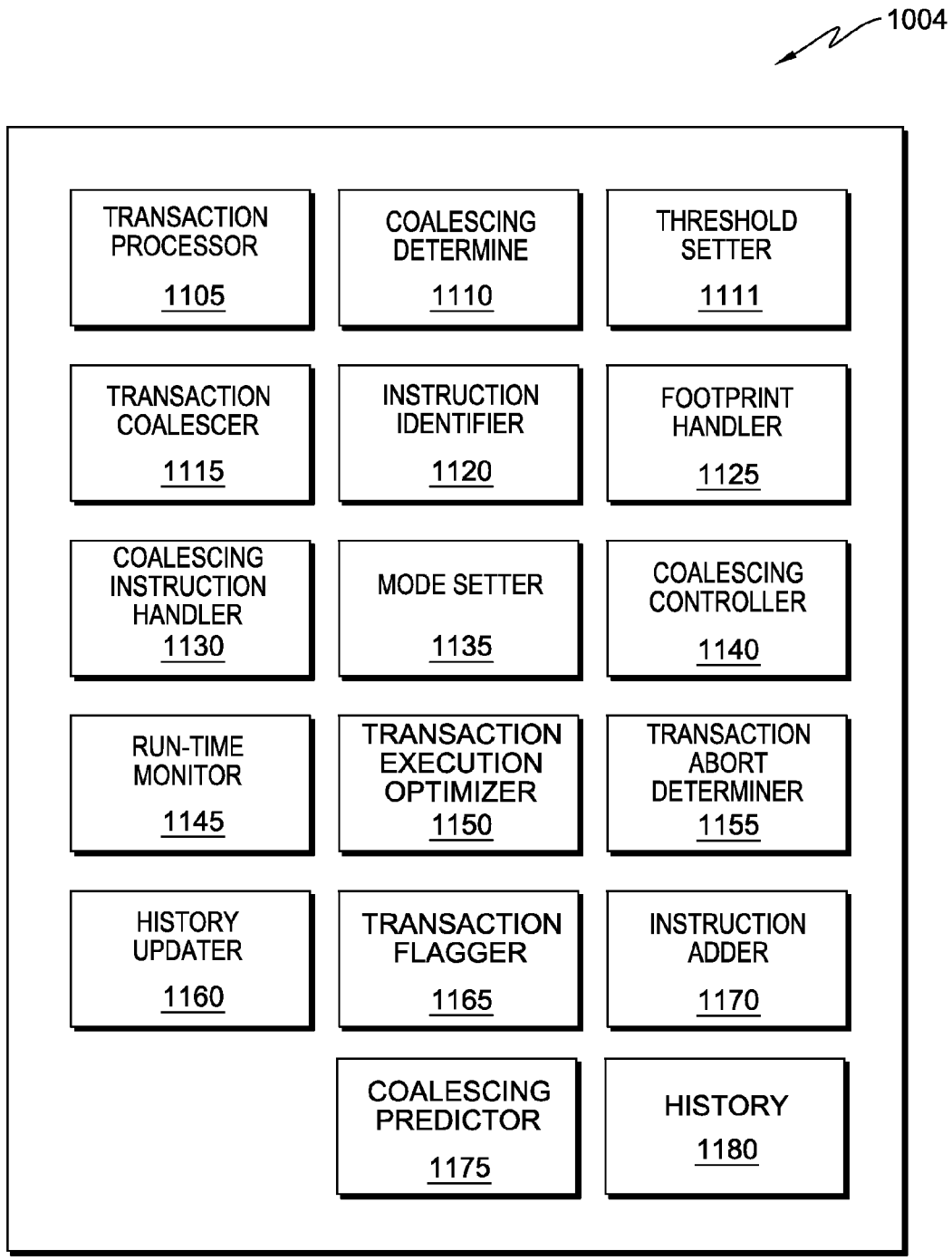
FIG. 11 depicts various hardware structures that exist as part of processor(s), of FIG. 10, in accordance with various embodiments of the present disclosure.

FIG. 11 depicts various hardware structures that exist as part of processor(s) 1004, of FIG. 10, in accordance with various embodiments. In certain embodiments, some of the hardware structures of FIG. 11 are substituted, in whole or in part, with software equivalents. Further, in some embodiments, certain hardware structures described in FIG. 11 are included as part of, or are configured to support the function of, coalescing control 300, dynamic prediction 500, control indicator 600 coalescing optimizer 700, and transaction coalescing operations 400.

Transaction processor 1105 is a hardware structure configured to execute transaction begin instructions of outermost transactions, the transactions themselves, transaction end instructions, coalesced transactions, non-transaction instructions located between transactions, coalescing instructions, and memory commits of results of executed transactions. In addition, transaction processor 1105, based on executing a transaction begin instruction, processes the respective transaction associated with the transaction begin instruction. In addition, if it is determined, by coalescing determiner 1110, that an outermost transaction is not-to-be coalesced with another transaction, transaction processor 1105 commits, a first store data of that outermost transaction to memory based on encountering the transaction end instruction of that outermost transaction.

Coalescing determiner 1110 is a hardware structure configured to determine whether the first transaction is to-be coalesced with a second outermost transaction, based on the transaction processor 1105 encountering a first transaction end instruction of a first outermost transaction. Coalescing determiner 1110 determines whether the first outermost transaction is to-be coalesced with a second outermost transaction based on at least one of: a number of instructions between the first outermost transaction and the second outermost transaction, a time period required to process the first outermost transaction and second outermost transaction, a quantity of resources required to process the first outermost transaction and second outermost transaction, a maximum number of transactions that can be coalesced, and a history of coalescing outmost transactions that lead to an abort status. Based on the execution of one or more coalescing instructions, coalescing determiner 1110 determines whether two outermost transactions are to be coalesced. Coalescing determiner 1110 also determines whether two outermost transactions are to be coalesced based on a result of an executed instrumentation program. If it is determined by coalescing determiner 1110 that a first outermost transaction and a second outermost transaction, of a plurality of transactions of an associated program, should be coalesced, then those transactions are coalesced, using transaction coalescer 1115. Coalescing determiner 1110 also determines whether two outermost transactions are to be coalesced based on based on, at least in part, on a history of coalescing.

Threshold setter 1111 is a hardware structure configured to set threshold values for coalescing transactions based, at least in part, on one or more coalescing instructions being executed by transaction processor 1105. Such threshold values are determined by threshold setter 1111 based, at least in part, upon a pre-existing threshold value, a history of coalescing, and resource limits for processing transactions.

Transaction coalescer 1115 is a hardware structure configured to coalesce transactions based on a determination by coalescing determiner 1110 that a first outermost transaction is to-be coalesced with a second outermost transaction. To coalesce transactions, transaction coalescer 1115 performs a method comprising: (i) not-committing store data of the first outermost transaction to memory prior to processing the second outermost transaction; (ii) based on encountering a second transaction begin instruction of the second outermost transaction, processing the second transaction; (iii) based on the processing the second transaction encountering a second transaction end instruction of the second outermost transaction, and (iv) committing the store data of the coalesced first outermost transaction and second outermost transaction to memory. If it is determined, by instruction handler 1120, that one or more instructions following the first outermost transaction can be processed as part of the coalesced transactions, transaction coalescer 1115 executes the one or more instructions following the first outermost transaction as part of the coalesced first outermost transaction and second outermost transaction. Transaction processor 1105 then commits store data of the one or more instructions to memory as part of committing store data of the coalesced first outermost transaction and second outermost transaction to memory.

Instruction identifier 1120 is a hardware structure configured to identify one or more instructions that follow a first outermost transaction and precede a second outermost transaction. Instruction identifier 1120 also determines whether the one or more instructions can be processed as part of the coalesced transactions based on at least one of: a time period required to process the one or more instructions, a quantity of resources required to process the one or more instructions, and a category to which the one or more instructions belong.

Footprint handler 1125 is a hardware structure configured to add one or more markers to a memory footprint of a coalesced first outermost transaction and a second outermost transaction to indicate respective regions of memory that are used for the processing of the first outermost transaction and the second outermost transaction. The memory footprint includes memory addresses that are read from and written to during the processing of the first outermost transaction and the second outermost transaction, and wherein said markers are used to (i) rollback the coalesced transaction in the case of an abort, and (ii) control coalescing of outermost transactions.

Coalescing instruction handler 1130 is a hardware structure configured to execute one or more coalescing instructions for controlling coalescing of a plurality of outermost transactions. The one or more coalescing instructions, when executed, indicate to coalescing determiner 1110 which outermost transactions can be coalesced. The one or more coalescing instructions can include one or both of a coalescing prefix that is associated with a transaction begin instruction of an outermost transaction and a coalescing argument associated with a transaction begin instruction of an outermost transaction. The one or more coalescing instructions can include one or both of a coalescing prefix that is associated with a transaction end instruction of an outermost transaction and a coalescing argument associated with the transaction end instruction of an outermost transaction.

Mode setter 1135 is a hardware structure configured to execute set-transaction-coalesce-mode (STCM) instructions and reset-transaction-coalesce-mode (RTCM) instructions. Executing the STCM instruction causes the processor to enter STCM mode. Entering STCM mode indicates at least one of (i) that subsequent coalescing instructions are enabled to cause transactions to-be coalesced, (ii) a maximum number of instructions that can be present between two outermost transactions to be coalesced, and (iii) a type of instructions that can be present between two outermost transactions to be coalesced. Conversely, executing a RTCM instruction causes the processor to exit STCM mode. Exiting STCM mode results in one or more of (i) a cessation of execution of subsequent coalescing instructions, (ii) a modification of a number of instructions that exists between two outermost transactions, and (iii) a modification of a type of instruction that exists between two outermost transactions.

Coalescing controller 1140 is a hardware structure configured to disable coalescing of a given outermost transaction based on a determination, by coalescing determiner 1110, that coalescing will exceed or has previously exceeded a threshold value, generated by threshold setter 1111. Wherein an exceeding of the threshold value indicates any one of: a stall being exhibited by an outermost transaction to be coalesced, a maximum number of instructions that can exist between two outermost transactions to be coalesced, a maximum time period required to process outermost transactions that are coalesced, a quantity of resources that are required to process outermost transactions that are coalesced, a maximum number of outermost transactions that can be coalesced, a number of allowable instances of coalescing that particular outermost transaction that lead to an abort status, and a history of coalesced transactions that previously experienced an abort.

Run-time monitor 1145 is a hardware structure configured to execute a run-time instrumentation program for monitoring and modifying an associated program having a plurality of transactions. Based on the execution of transactions of the associated program, the run-time instrumentation program dynamically obtains instrumentation information associated with the execution of the associated program. Run-time monitor 1145 also generates an environment for run-time profiling of the continued execution of the associated program to obtain instrumentation information. Run-time monitor 1145 profiles the execution of the associated program using the obtained instrumentation information as well as changes in the run-time environment of the associated program. Run-time monitor 1145 processes run-time instrumentation directives of the run-time instrumentation program and configures the controls of run-time instruments based, at least in part, on the processed run-time instrumentation directives. The run-time instruments include one or more instructions to obtain instrumentation information regarding the execution of transactions of the associated program. The gathered instrumentation information includes one or more of: (i) a reason for a coalesced outermost transaction being aborted, and the number of aborts it has received (ii) a number of instructions between two coalesced outermost transactions, (iii) a type of instruction between two coalesced outermost transactions, (iv) whether any of the instructions between two coalesced outermost transactions are restricted from running in a given outermost transaction, (v) a number of dynamic instructions in a given outermost transaction, and (vi) the size of a footprint of a dynamic instruction in a given outermost transaction.

Transaction execution optimizer 1150 is a hardware structure configured to, based on obtained instrumentation information, dynamically modify the continued execution of transactions of the associated program to optimize transactional execution (TX). The run-time instrumentation program modifies the continued execution of the associated program by adding one or more coalescing instructions to the associated program to control coalescing of one or more of the plurality of transactions based, at least in part, on an analysis of gathered instrumentation information. The one or more coalescing instructions include one or more of: (i) an instruction to coalesce outermost transactions, (ii) an instruction to remove a transaction begin or end instruction or to not execute a transaction begin or end instruction, (iii) an instruction to modify a transaction begin or end instruction such that the associated outermost transaction cannot be coalesced with a type of outermost transaction if a number of already coalesced instructions is greater than a threshold, (iv) an instruction to indicate that a particular outermost transaction is not-to-be coalesced with a type of outermost transaction if the number of already coalesced instructions is greater than the threshold, (v) an instruction to process non-transactional instructions as transactional instructions, (vi) an instruction to cease coalescing outermost transactions, and (vii) an instruction to specify a maximum allowable number of coalesced outermost transactions.

Transaction abort determiner 1155 is a hardware structure configured to determine whether a first plurality of outermost transactions, from the associated program, which were coalesced, experienced an abort. The first plurality of outermost transactions includes a first instance of a first transaction.

History updater 1160 is a hardware structure configured to updating, by the processor, a history of the associated program to reflect the results of the determination. Based on transaction abort determiner 1155 determining that the first plurality of outermost transactions did or did-not experience an abort, updating the history of the associated program, using history updater 1160, to indicate whether the first plurality of outermost transactions did or did-not experience an abort.

Transaction flagger 1165 is a hardware structure configured to, based on transaction abort determiner 1155 determining that the plurality of outermost transactions did-not experience an abort, flag the first outermost transaction to reflect the determination that the plurality of outermost transactions did-not experience an abort. Based on the determination that the first plurality of outermost transactions did experience an abort, flagging, by transaction flagger 1165, the first outermost transaction based, at least in part, on the cause of the abort.

Instruction adder 1170 is a hardware structure configured to determine whether to add instructions to coalesce a second instance of a first outermost transaction based, at least in part, on the updated history of an associated program that included the first instance of the first outermost transaction. Based on the determination indicating that instructions to coalesce the second instance of the first outermost transaction are to-be added, instruction adder 1170 causing the execution of an associated program which adds to a second plurality of outermost transactions one or more instructions to coalesce the second instance of the first outermost transaction.

Coalescing predictor 1175 is a hardware structure configured to predict a result of coalescing an outermost transaction, at least in part, on the updated history of the associated program. Such a prediction may be based on the results of previous instances of transactions being coalesced. Such predictions may also be based on similarities between various transactions.

History 1180 is a hardware structure configured to store and communicate data that can be used to predict the outcome of coalescing outermost transactions. Such data may include the updated history of associated programs and results of previous instances of transactions being coalesced. Such data may be used by coalescing predictor 1175 to predict the result of coalescing an outermost transaction. The data included in history 1180 can be updated by, for example, hardware structures such as history updater 1160.

Figure 12:
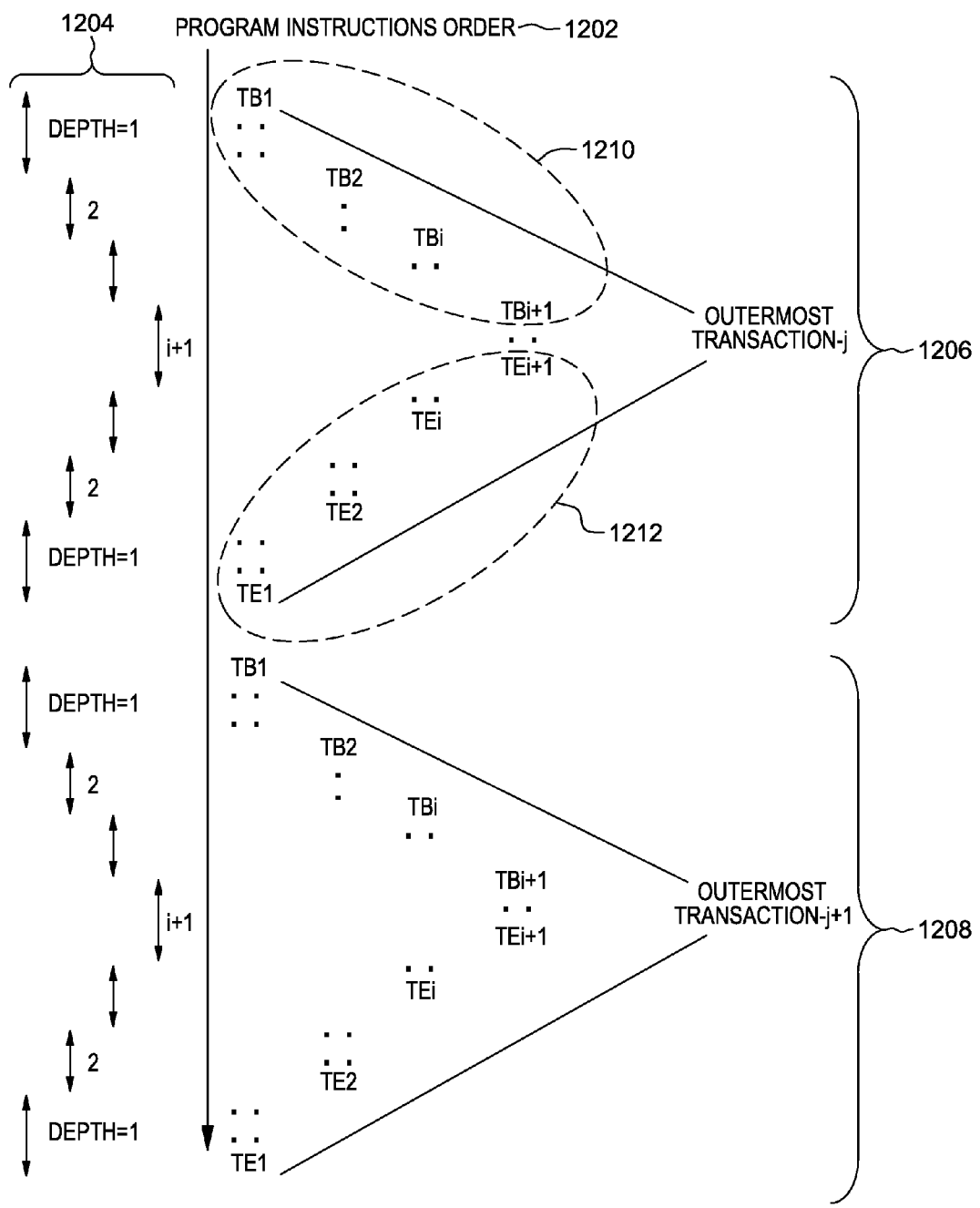
FIG. 12 depicts an example of transaction nesting to aid the reader in the identifying the differences between nested transactions and coalescing outermost transactions, in accordance with embodiments of the present disclosure.

FIG. 12 depicts an example of transaction nesting in an embodiment. FIG. 12 is intended to aid the reader in the identifying the differences between nested transactions and coalescing outermost transactions. An example of nested transactions are the transactions within 1206. Each time a TBEGIN is encountered, the nesting depth in incremented by 1 and each time a TEND is encountered the nesting depth is decremented by 1. An outermost TBEGIN is the one that increments the depth from 0 to 1 and an outermost TEND is the one that decrements the depth from 1 to 0.

Known art solutions are directed to the handling of nested transactions. Conversely, the solutions described in FIGS. 4-8 address the coalescing of outermost transactions. In FIG. 9, this can be understood to be the combining of outermost transaction TB1-TE1 in 1206 with outermost transaction TB1-TE1 in 1208. The instructions can be executed in order based on the program instruction order 1202 (i.e., the order in which the program issues the instructions) per thread. For each transaction begin (TBEGIN) instruction 1210, the nesting depth 1204 (i) is increased by one. For each transaction end (TEND) instruction 1212, the nesting depth 1204 decreases by one. When a first outer transaction 1206 is started, outermost transaction count (j) is increased by one. When a second outer transaction 1208 is started, j is increased by one. As each of the first outer transaction 1206 and the second outer transaction 1208 are completed j is decremented by 1.

Figure 13:
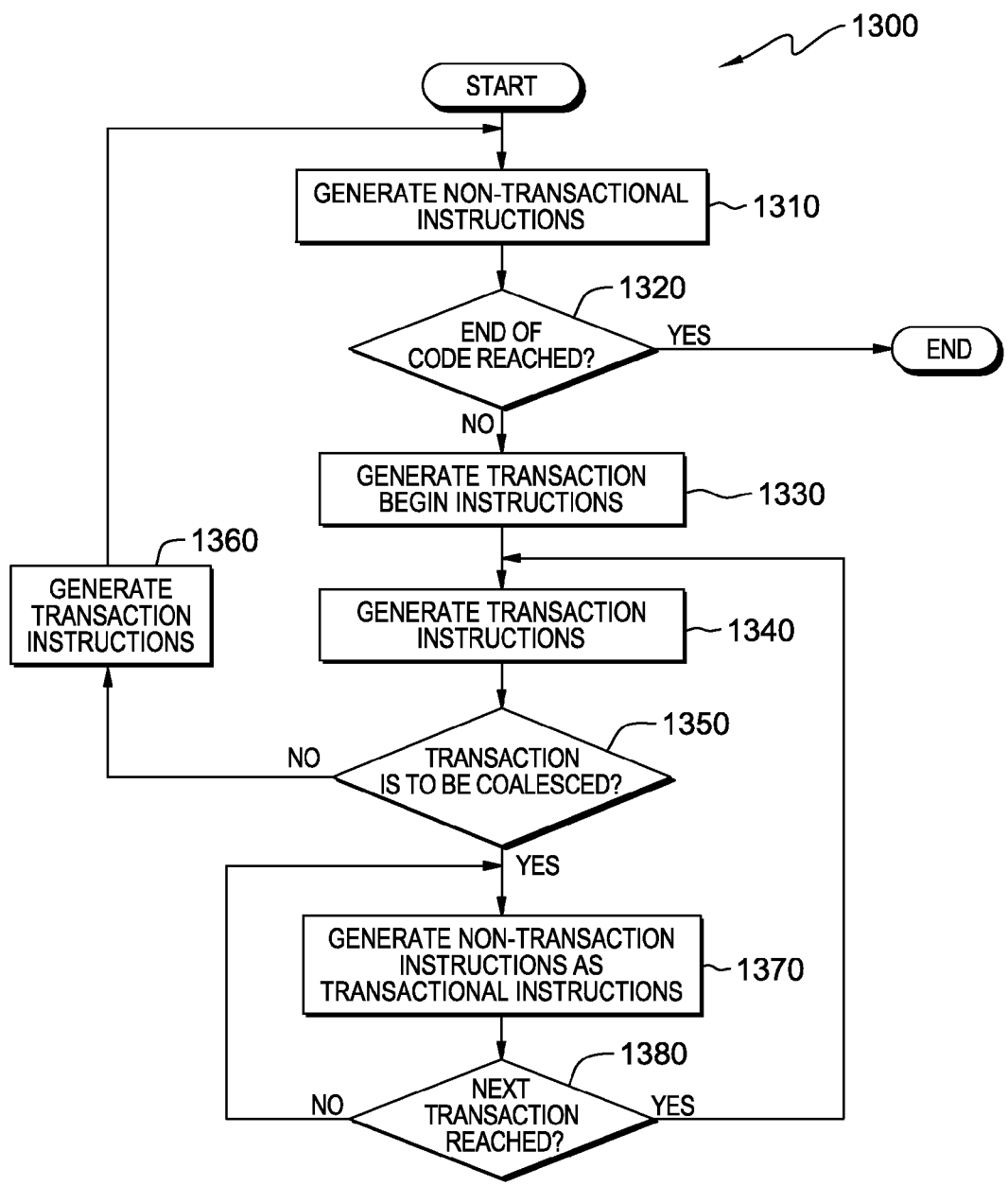
FIG. 13 illustrates a method of operational activity executed by a dynamic compiler that performs aspects of the transaction coalescing process, in accordance with embodiments of the present disclosure.

FIG. 13 illustrates a method, 1300, of operational activity executed by a dynamic compiler that performs aspects of the transaction coalescing process, in accordance with embodiments of the present disclosure. It should be noted that such a dynamic compiler can, in certain embodiments, allow for the coalescing of outermost transactions without the requirement of hardware that has been configured for coalescing of outermost transactions.

In some embodiments, such a dynamic compiler, incorporates various aspects of coalescing control 300, dynamic prediction 500, control indicator 600 and coalescing optimizer 700, as well as software aspects of transaction coalescing operations 400 to allow the dynamic compiler to make determinations and generate instructions as described in the discussion of method 1300. In other embodiments, coalescing control 300, dynamic prediction 500, control indicator 600 and coalescing optimizer 700, as well as aspects of transaction coalescing operations 400 work in conjunction with and are in communication with such a dynamic compiler; thereby allowing the dynamic compiler to execute the operations of method 1300.

Method 1300 illustrates a software implementation of transaction coalescing when no hardware support for hardware-controlled transaction coalescing is provided. In one embodiment, code generation and re-optimization is initiated after a fixed amount of time for each code fragment. A code fragment can be any of a plurality of known regions that dynamic optimizers may act upon. In previous code generations, these include: a trace, a tree region, a function, a hot region, etc., or any other group of instructions a dynamic code optimization and/or code generation method may be executed upon.

In operation 1310, non-transactional instructions are generated by the dynamic compiler to be executed non-transactionally. In decision operation 1320, a determination is made as to whether the end of the code, of the non-transactional instructions, has been reached, i.e., whether all instructions of a code fragment have been generated by the dynamic compiler and whether the end of a code fragment has been reached. If it is determined that the end of the code has been reached (decision operation 1320, yes branch), then method 1300 ends. If it is determined that the end of the code has-not been reached (decision operation 1320, no branch), then method 1300 proceeds to operation 1330.

In operation 1330, a transaction begin instruction is generated in response to the identification of the beginning of a transaction. In operation 1340, the transaction instructions are generated. In decision operation 1350, a determination is made as to whether coalescing of the transaction, with a subsequent transaction, is permitted.

If it is determined that coalescing of the transaction is-not permitted (decision operation 1350, no branch), then method 1300 proceeds to operation 1360. In operation 1360, a transaction end instruction is generated in response to the identification of the end of the transaction. Method 1300 then proceeds to 1310. If it is determined that coalescing of the transaction is permitted (decision operation 1350, yes branch), then method 1300 proceeds to operation 1370.

In operation 1370 non-transactional instructions are generated in the form of transactional instructions. Such instructions follow the first transaction, which is to be coalesced, and precede the next transaction. In other words, the non-transactional instructions, between the first and second transaction to be coalesced, are generated as part of the coalesced transaction. In at least one embodiment, an analysis to determine whether coalescing of transactions is permitted includes an analysis of intervening instructions to assure that all intervening instructions may be executed transactionally. In an alternative embodiment, no such determination is made during initial determination as to whether coalescing of transactions is permitted. In such an alternative embodiment, when an instruction that cannot be executed transactionally is encountered, the transaction is ended by generation of a transaction end instruction, as described in operation 1360, prior to generation of the non-transactional instruction.

In decision operation 1380, of method 1300, it is determined whether the beginning of the next transaction has been reached. If it is determined that the beginning of the next transaction has been reached (decision operation 1380, yes branch), then method 1300 proceeds to operation 1340. If it is determined that the beginning of the next transaction has-not been reached (decision operation 1380, no branch), then method 1300 proceeds to operation 1370.

Various embodiments of the present disclosure may be implemented in a data processing system suitable for storing and/or executing program code that includes at least one processor coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Figure 14:
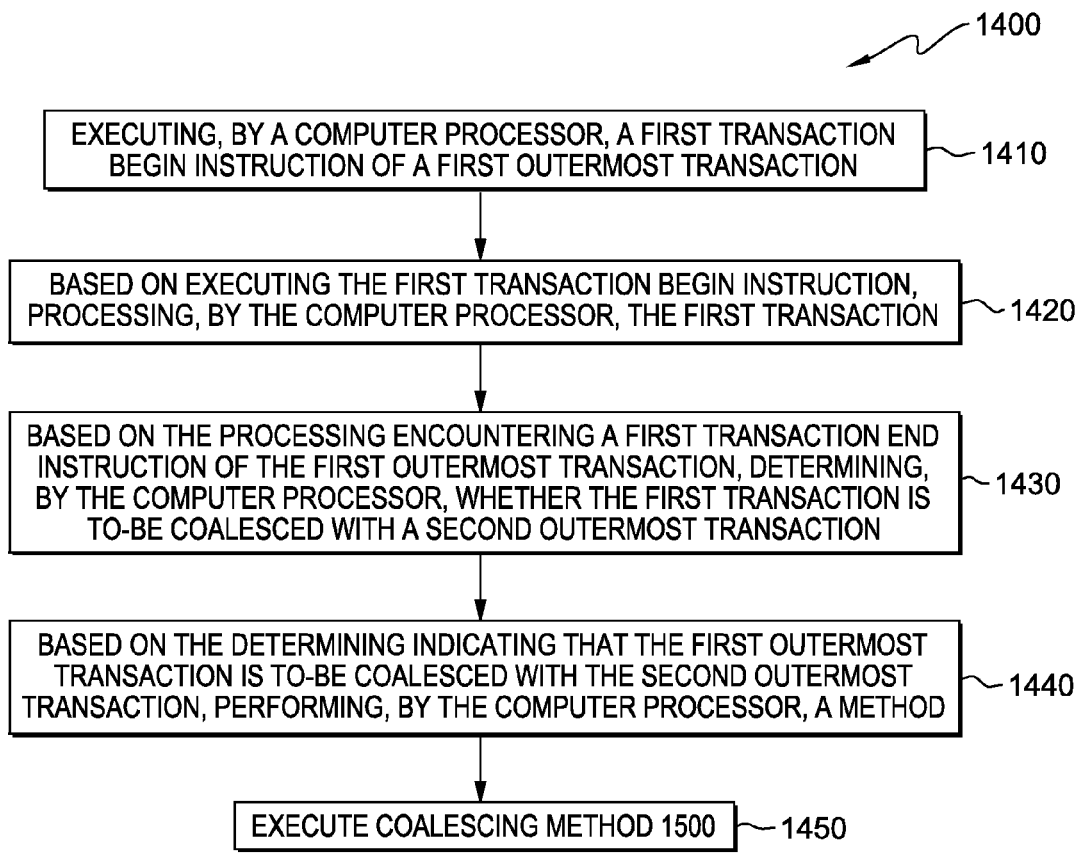
FIG. 14 depicts a flow diagram illustrating an embodiment for coalescing two outermost transactions in a transactional memory environment, in accordance with embodiments of the present disclosure.

FIG. 14 illustrates an embodiment, 1400, of the present disclosure for coalescing outermost memory transactions.

The embodiment executing 1410, by a computer processor, a first transaction begin instruction of a first outermost transaction. The embodiment, based on executing the first transaction begin instruction, processing 1420, by the computer processor, the first transaction. The embodiment, based on the processing encountering a first transaction end instruction of the first outermost transaction, determining 1430, by the computer processor, whether the first transaction is to-be coalesced with a second outermost transaction. The embodiment, based on the determining indicating that the first outermost transaction is to-be coalesced with the second outermost transaction, performing 1440, by the computer processor, a method. In the embodiment, execute 1450, by the computer processor, coalescing method 1500, depicted in FIG. 15.

Figure 15:
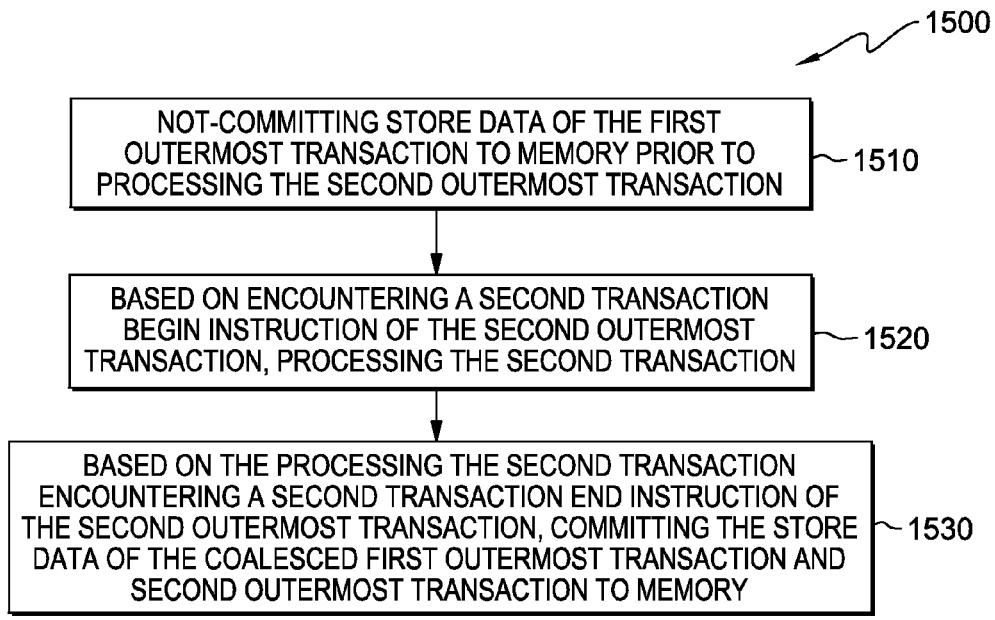
FIG. 15 depicts a flow diagram illustrating an embodiment of the present disclosure.

As depicted in FIG. 15, in an embodiment, a method for coalescing outermost transactions (herein denoted coalescing method 1500). In the embodiment, the method comprising: not-committing 1510 store data of the first outermost transaction to memory prior to processing the second outermost transaction. In the embodiment, based on encountering a second transaction begin instruction of the second outermost transaction, processing 1520 the second transaction. In the embodiment, based on the processing the second transaction encountering a second transaction end instruction of the second outermost transaction, committing 1530 the store data of the coalesced first outermost transaction and second outermost transaction to memory.

Figure 16:
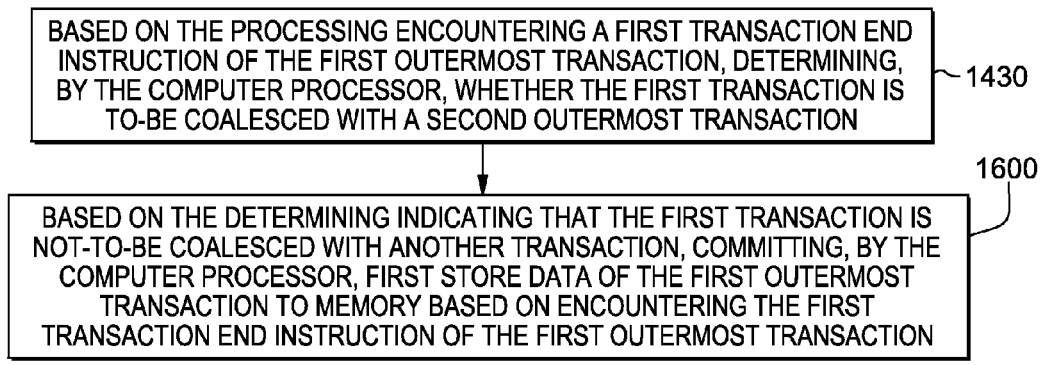
FIG. 16 depicts a flow diagram illustrating an embodiment of the present disclosure.

As depicted in FIG. 16, after determining 1430, in an embodiment, based on the determining indicating that the first transaction is not-to-be coalesced with another transaction, committing 1600, by the computer processor, first store data of the first outermost transaction to memory based on encountering the first transaction end instruction of the first outermost transaction.

Figure 17:
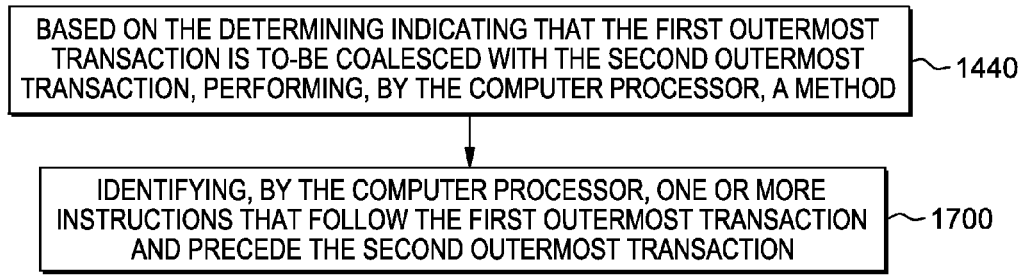
FIG. 17 depicts a flow diagram illustrating an embodiment of the present disclosure.

As depicted in FIG. 17, as part of performing 1440, in an embodiment, identifying 1700, by the computer processor, one or more instructions that follow the first outermost transaction and precede the second outermost transaction.

Figure 18:
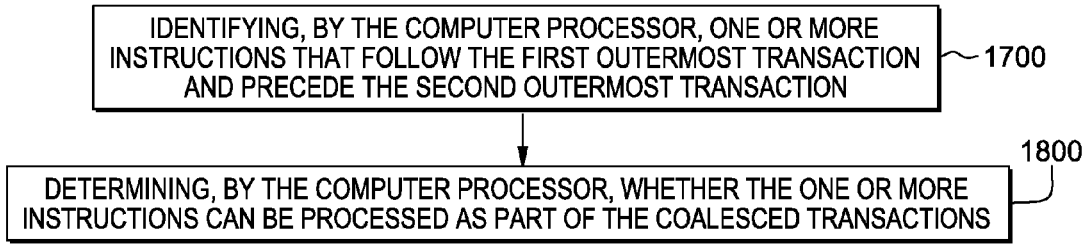
FIG. 18 depicts a flow diagram illustrating an embodiment of the present disclosure.

As depicted in FIG. 18, after identifying 1700, in an embodiment, determining 1800, by the computer processor, whether the one or more instructions can be processed as part of the coalesced transactions.

Figure 19:
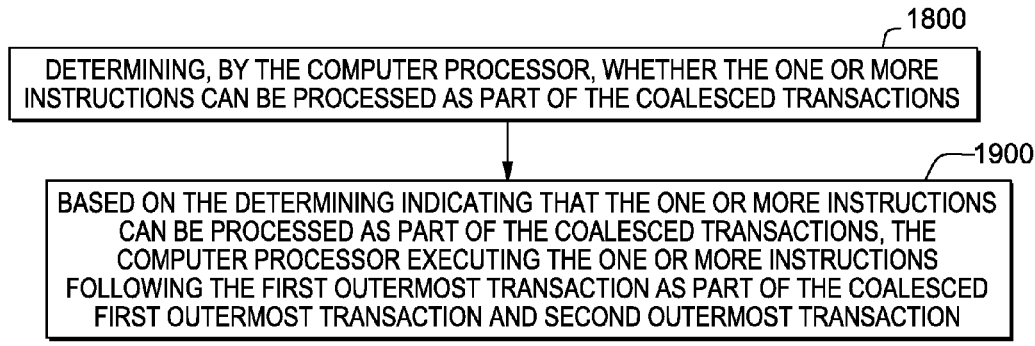
FIG. 19 depicts a flow diagram illustrating an embodiment of the present disclosure.

As depicted in FIG. 19, an embodiment determining 1800. The embodiment, based on the determining indicating that the one or more instructions can be processed as part of the coalesced transactions, the computer processor executing 1900 the one or more instructions following the first outermost transaction as part of the coalesced first outermost transaction and second outermost transaction.

Figure 20:
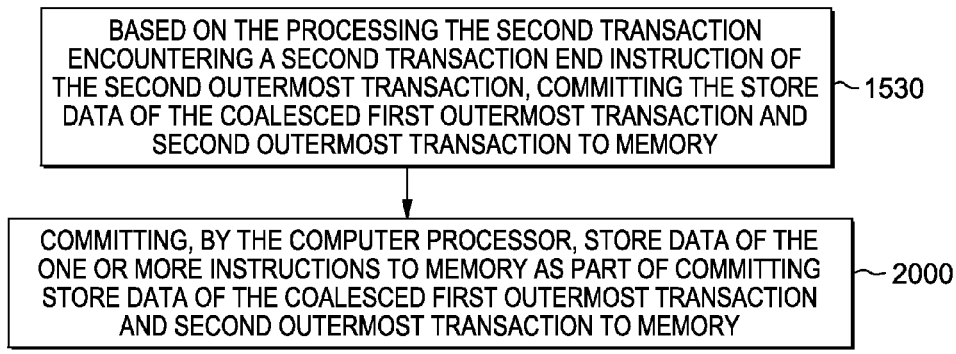
FIG. 20 depicts a flow diagram illustrating an embodiment of the present disclosure.

As depicted in FIG. 20, included as part of committing 1530, in an embodiment, committing 2000, by the computer processor, store data of the one or more instructions to memory as part of committing store data of the coalesced first outermost transaction and second outermost transaction to memory.

Figure 21:
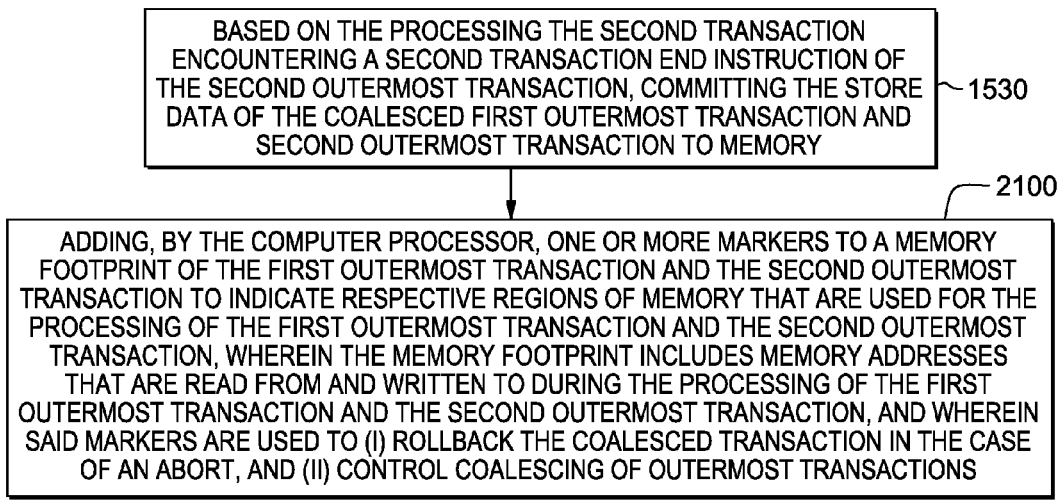
FIG. 21 depicts a flow diagram illustrating an embodiment of the present disclosure.

As depicted in FIG. 21, included as part of committing 1530, in an embodiment, adding 2100, by the computer processor, one or more markers to a memory footprint of the first outermost transaction and the second outermost transaction to indicate respective regions of memory that are used for the processing of the first outermost transaction and the second outermost transaction, wherein the memory footprint includes memory addresses that are read from and written to during the processing of the first outermost transaction and the second outermost transaction, and wherein said markers are used to (i) rollback the coalesced transaction in the case of an abort, and (ii) control coalescing of outermost transactions.

Figure 22:
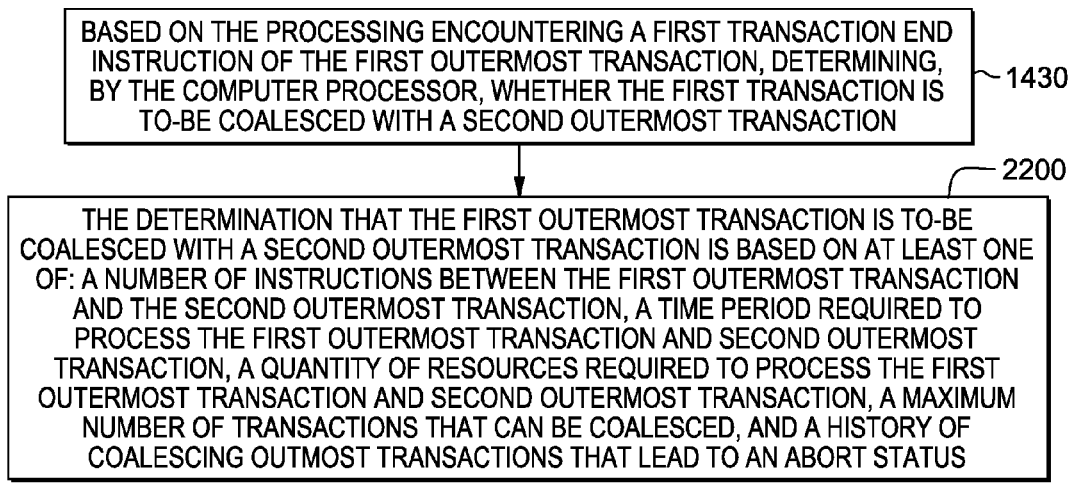
FIG. 22 depicts a flow diagram illustrating an embodiment of the present disclosure.

As depicted in FIG. 22, included as part of determining 1430, in an embodiment, the determination that the first outermost transaction is to-be coalesced with a second outermost transaction is based on at least one of: a number of instructions between the first outermost transaction and the second outermost transaction, a time period required to process the first outermost transaction and second outermost transaction, a quantity of resources required to process the first outermost transaction and second outermost transaction, a maximum number of transactions that can be coalesced, and a history of coalescing outmost transactions that lead to an abort status.

Figure 23:
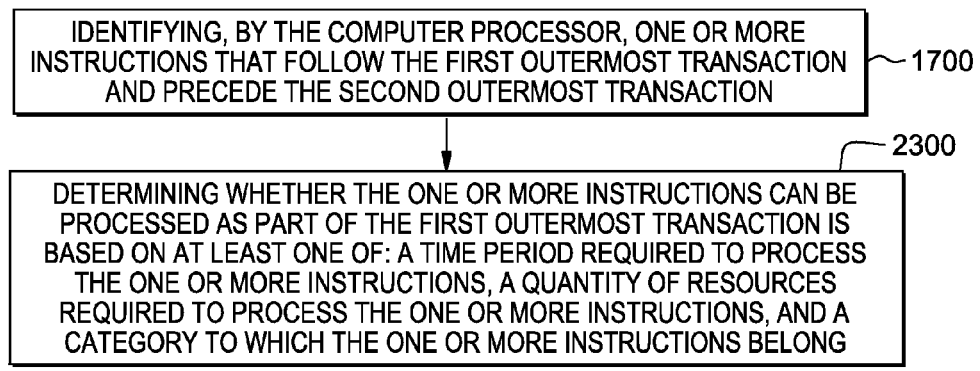
FIG. 23 depicts a flow diagram illustrating an embodiment of the present disclosure.

As depicted in FIG. 23, after determining 1700, in an embodiment, determining 2300 whether the one or more instructions can be processed as part of the first outermost transaction is based on at least one of: a time period required to process the one or more instructions, a quantity of resources required to process the one or more instructions, and a category to which the one or more instructions belong.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

One or more of the capabilities of the present disclosure can be implemented in software, firmware, hardware, or some combination thereof. Further, one or more of the capabilities can be emulated.

One or more aspects of the present disclosure can be included in an article of manufacture (e.g., one or more computer program products) having, for instance, computer readable storage media 1008 of FIG. 10. The media has embodied therein, for instance, computer readable program code (instructions) to provide and facilitate the capabilities of the present disclosure. The article of manufacture can be included as a part of a computer system or as a separate product.

An embodiment may be a computer program product for enabling processor circuits to perform elements of the disclosure, the computer program product comprising a computer readable storage medium readable by a processing circuit and storing instructions for execution by the processing circuit for performing a method.

The computer readable storage medium (or media), being a tangible, non-transitory, storage medium having instructions recorded thereon for causing a processor circuit to perform a method. The "computer readable storage medium" being non-transitory at least because once the instructions are recorded on the medium, the recorded instructions can be subsequently read one or more times by the processor circuit at a times that are independent of the time of recording. The "computer readable storage media" being non-transitory including devices that retain recorded information only while powered (volatile devices) and devices that retain recorded information independently of being powered (non-volatile devices). An example, non-exhaustive list of "non-transitory storage media" includes, but is not limited to, for example:
- a semi-conductor storage device comprising, for example, a memory array such as a RAM or a memory circuit such as latch having instructions recorded thereon;
- a mechanically encoded device such as punch-cards or raised structures in a groove having instructions recorded thereon;
- an optically readable device such as a CD or DVD having instructions recorded thereon; and
- a magnetic encoded device such as a magnetic tape or a magnetic disk having instructions recorded thereon.

A non-exhaustive list of examples of computer readable storage medium include the following: a portable computer diskette, a hard disk, a random access memory (RAM), a read-only memory (ROM), an erasable programmable read-only memory (EPROM or Flash memory), a portable compact disc read-only memory (CD-ROM).

Although one or more examples have been provided herein, these are only examples. Many variations are possible without departing from the spirit of the present embodiment. For instance, processing environments other than the examples provided herein may include and/or benefit from one or more aspects of the present embodiment. Further, the environment need not be based on the z/Architecture®, but instead can be based on other architectures offered by, for instance, IBM®, Intel®, Sun Microsystems, as well as others. Yet further, the environment can include multiple processors, be partitioned, and/or be coupled to other systems, as examples.

As used herein, the term "obtaining" includes, but is not limited to, fetching, receiving, having, providing, being provided, creating, developing, etc.

The capabilities of one or more aspects of the present disclosure can be implemented in software, firmware, hardware, or some combination thereof. At least one program storage device readable by a machine embodying at least one program of instructions executable by the machine to perform the capabilities of the present disclosure can be provided.

The flow diagrams depicted herein are just examples. There may be many variations to these diagrams or the steps (or operations) described therein without departing from the spirit of the disclosure. For instance, the steps may be performed in a differing order, or steps may be added, deleted, or modified. All of these variations are considered a part of the claimed disclosure.

Although preferred embodiments have been depicted and described in detail herein, it will be apparent to those skilled in the relevant art that various modifications, additions, substitutions and the like can be made without departing from the spirit of the disclosure, and these are, therefore, considered to be within the scope of the disclosure, as defined in the following claims.

What is claimed is:

1. A computer system for coalescing two outermost transactions in a transactional memory environment, the computer system comprising:
    a memory; and
    a processor in communication with the memory, wherein the computer system is configured to perform a method, said method comprising:
        executing, by a processor, a first transaction begin instruction of a first outermost transaction;
        based on executing the first transaction begin instruction, processing, by the processor, the first outermost transaction;
        based on the processing encountering a first transaction end instruction of the first outermost transaction, determining, by the processor, whether the first outermost transaction is to-be coalesced with a second outermost transaction; and
        based on the determining indicating that the first outermost transaction is to-be coalesced with the second outermost transaction, performing a method comprising:
            not-committing, by the processor, store data of the first outermost transaction to memory prior to processing the second outermost transaction;
            based on encountering a second transaction begin instruction of the second outermost transaction, processing, by the processor, the second outermost transaction; and
            based on the processing the second transaction encountering a second transaction end instruction of the second outermost transaction, committing, by the processor, the store data of the coalesced first outermost transaction and second outermost transaction to memory.

2. The computer system of claim 1, the method further comprising:
    based on the determining indicating that the first outermost transaction is not-to-be coalesced with another transaction, committing first store data of the first outermost transaction to memory based on encountering the first transaction end instruction of the first outermost transaction.

3. The computer system of claim 1, the method further comprising:
    identifying one or more instructions that follow the first outermost transaction and precede the second outermost transaction;
    determining whether the one or more instructions can be processed as part of the coalesced transactions; and
    based on the determining indicating that the one or more instructions can be processed as part of the coalesced transactions, executing the one or more instructions following the first outermost transaction as part of the coalesced first outermost transaction and second outermost transaction.

4. The computer system of claim 3, the method further comprising:
    committing store data of the one or more instructions to memory as part of committing store data of the coalesced first outermost transaction and second outermost transaction to memory.

5. The computer system of claim 1, the method further comprising:
    adding one or more markers to a memory footprint of the first outermost transaction and the second outermost transaction to indicate respective regions of memory that are used for the processing of the first outermost transaction and the second outermost transaction, wherein the memory footprint includes memory addresses that are read from and written to during the processing of the first outermost transaction and the second outermost transaction, and wherein said markers are used to (i) rollback the coalesced transaction in the case of an abort, and (ii) control coalescing of outermost transactions.

6. The computer system of claim 1, wherein the determination that the first outermost transaction is to-be coalesced with a second outermost transaction is based on at least one of: a number of instructions between the first outermost transaction and the second outermost transaction, a time period required to process the first outermost transaction and second outermost transaction, a quantity of resources required to process the first outermost transaction and second outermost transaction, a maximum number of transactions that can be coalesced, and a history of coalescing outmost transactions that lead to an abort status.

7. The computer system of claim 3, wherein determining whether the one or more instructions can be processed as part of the first outermost transaction is based on at least one of: a time period required to process the one or more instructions, a quantity of resources required to process the one or more instructions, and a category to which the one or more instructions belong.

8. A computer program product for coalescing two outermost transactions in a transactional memory environment, the computer program product comprising:

a computer readable storage medium readable by a processing circuit and storing instructions for execution by the processing circuit for performing a method comprising:

executing, by the processor, a first transaction begin instruction of a first outermost transaction;

based on executing the first transaction begin instruction, processing, by the processor, the first outermost transaction;

based on the processing encountering a first transaction end instruction of the first outermost transaction, determining, by the processor, whether the first outermost transaction is to-be coalesced with a second outermost transaction; and based on the determining indicating that the first outermost transaction is to-be coalesced with the second outermost transaction, performing a method comprising:

not-committing, by the processor, store data of the first outermost transaction to memory prior to processing the second outermost transaction;

based on encountering a second transaction begin instruction of the second outermost transaction, processing, by the processor, the second outermost transaction; and based on the processing the second transaction encountering a second transaction end instruction of the second outermost transaction, committing, by the processor, the store data of the coalesced first outermost transaction and second outermost transaction to memory.

9. The computer program product of claim 8, the method further comprising:

based on the determining indicating that the first outermost transaction is not-to-be coalesced with another transaction, committing first store data of the first outermost transaction to memory based on encountering the first transaction end instruction of the first outermost transaction.

10. The computer program product of claim 8, the method further comprising:

identifying one or more instructions that follow the first outermost transaction and precede the second outermost transaction;

determining whether the one or more instructions can be processed as part of the coalesced transactions; and based on the determining indicating that the one or more instructions can be processed as part of the coalesced transactions, executing the one or more instructions following the first outermost transaction as part of the coalesced first outermost transaction and second outermost transaction.

11. The computer program product of claim 10, the method further comprising:

committing store data of the one or more instructions to memory as part of committing store data of the coalesced first outermost transaction and second outermost transaction to memory.

12. The computer program product of claim 8, the method further comprising:

adding one or more markers to a memory footprint of the first outermost transaction and the second outermost transaction to indicate respective regions of memory that are used for the processing of the first outermost transaction and the second outermost transaction, wherein the memory footprint includes memory addresses that are read from and written to during the processing of the first outermost transaction and the second outermost transaction, and wherein said markers are used to (i) rollback the coalesced transaction in the case of an abort, and (ii) control coalescing of outermost transactions.

13. The computer program product of claim 8, wherein the determination that the first outermost transaction is to-be coalesced with a second outermost transaction is based on at least one of: a number of instructions between the first outermost transaction and the second outermost transaction, a time period required to process the first outermost transaction and second outermost transaction, a quantity of resources required to process the first outermost transaction and second outermost transaction, a maximum number of transactions that can be coalesced, and a history of coalescing outmost transactions that lead to an abort status.

14. The computer program product of claim 10, wherein determining whether the one or more instructions can be processed as part of the first outermost transaction is based on at least one of: a time period required to process the one or more instructions, a quantity of resources required to process the one or more instructions, and a category to which the one or more instructions belong.

15. A method for coalescing two outermost transactions in a transactional memory environment, the method comprising:

executing, by a computer processor, a first transaction begin instruction of a first outermost transaction;

based on executing the first transaction begin instruction, processing, by the computer processor, the first outermost transaction;

based on the processing encountering a first transaction end instruction of the first outermost transaction, determining, by the computer processor, whether the first outermost transaction is to-be coalesced with a second outermost transaction; and based on the determining indicating that the first outermost transaction is to-be coalesced with the second outermost transaction, performing, by the computer processor, a method comprising:

not-committing, by the processor, store data of the first outermost transaction to memory prior to processing the second outermost transaction;

based on encountering a second transaction begin instruction of the second outermost transaction, processing, by the processor, the second outermost transaction; and based on the processing the second outermost transaction encountering a second transaction end instruction of the second outermost transaction, committing, by the processor, the store data of the coalesced first outermost transaction and second outermost transaction to memory.

16. The method of claim 15, the method further comprising:

based on the determining indicating that the first outermost transaction is not-to-be coalesced with another transaction, committing, by the computer processor, first store data of the first outermost transaction to memory based on encountering the first transaction end instruction of the first outermost transaction.

17. The method of claim 15, the method further comprising:

identifying, by the computer processor, one or more instructions that follow the first outermost transaction and precede the second outermost transaction;

determining, by the computer processor, whether the one or more instructions can be processed as part of the coalesced transactions; and based on the determining indicating that the one or more instructions can be processed as part of the coalesced transactions, the computer processor executing the one or more instructions following the first outermost transaction as part of the coalesced first outermost transaction and second outermost transaction.

18. The method of claim 17, the method further comprising:

committing, by the computer processor, store data of the one or more instructions to memory as part of committing store data of the coalesced first outermost transaction and second outermost transaction to memory.

19. The method of claim 15, the method further comprising:

adding, by the computer processor, one or more markers to a memory footprint of the first outermost transaction and the second outermost transaction to indicate respective regions of memory that are used for the processing of the first outermost transaction and the second outermost transaction, wherein the memory footprint includes memory addresses that are read from and written to during the processing of the first outermost transaction and the second outermost transaction, and wherein said markers are used to (i) rollback the coalesced transaction in the case of an abort, and (ii) control coalescing of outermost transactions.

20. The method of claim 15, wherein the determination that the first outermost transaction is to-be coalesced with a second outermost transaction is based on at least one of: a number of instructions between the first outermost transaction and the second outermost transaction, a time period required to process the first outermost transaction and second outermost transaction, a quantity of resources required to process the first outermost transaction and second outermost transaction, a maximum number of transactions that can be coalesced, and a history of coalescing outmost transactions that lead to an abort status.

* * * * *